(12) United States Patent
Shinke et al.

(10) Patent No.: US 10,229,277 B2
(45) Date of Patent: Mar. 12, 2019

(54) CODE PROCESSING APPARATUS AND COMPUTER PROGRAM PRODUCT

(71) Applicants: Kabushiki Kaisha Toshiba, Minato-ku (JP); TOSHIBA SOLUTIONS CORPORATION, Kawasaki-shi (JP)

(72) Inventors: Yurie Shinke, Ota (JP); Fukutomo Nakanishi, Fuchu (JP); Hiroyoshi Haruki, Kawasaki (JP); Mikio Hashimoto, Bunkyo (JP); Fumihiko Sano, Kawasaki (JP)

(73) Assignees: Kabushiki Kaisha Toshiba, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 237 days.

(21) Appl. No.: 14/847,975

(22) Filed: Sep. 8, 2015

(65) Prior Publication Data

US 2015/0379290 A1 Dec. 31, 2015

Related U.S. Application Data

(63) Continuation of application No. PCT/JP2013/057840, filed on Mar. 19, 2013.

(51) Int. Cl.
*G06F 7/04* (2006.01)
*G06F 17/30* (2006.01)
(Continued)

(52) U.S. Cl.
CPC ............ *G06F 21/6209* (2013.01); *G06F 8/54* (2013.01); *G06F 8/70* (2013.01); *G06F 9/44521* (2013.01);
(Continued)

(58) Field of Classification Search
CPC ....................................................... G06F 8/54
See application file for complete search history.

(56) References Cited

U.S. PATENT DOCUMENTS

| 6,715,142 B1 * | 3/2004 | Saito | G06F 21/126 |
|---|---|---|---|
| | | | 717/159 |
| 2002/0138748 A1 * | 9/2002 | Hung | G06F 21/6281 |
| | | | 713/190 |

(Continued)

FOREIGN PATENT DOCUMENTS

| CN | 1971519 A | 5/2007 |
|---|---|---|
| CN | 101650664 A | 2/2010 |

(Continued)

OTHER PUBLICATIONS

Combined Office Action and Search Report dated Mar. 22, 2017 in Chinese Patent Application No. 201380074351.0 (with English translation of categories of cited documents).
International Search Report dated Jul. 2, 2013 in PCT/JP2013/057840 (with English language translation).
Written Opinion dated Jul. 2, 2013 in PCT/JP2013/057840 (submitting English translation only).

*Primary Examiner* — Brandon S Hoffman
*Assistant Examiner* — Samuel Ambaye
(74) *Attorney, Agent, or Firm* — Oblon, McClelland, Maier & Neustadt, L.L.P.

(57) ABSTRACT

According to an embodiment, a code processing apparatus includes a determining unit, a concealing unit, an instructing unit, and an unconcealing unit. The determining unit is configured to determine, based on relocation information included in first code data that includes a code body and relocation information representing a portion of the code body to be relocated by a linker, a first portion including at least a part of the code body that is other than the portion. The concealing unit is configured to conceal the first portion. The instructing unit is configured to instruct the linker to process the first code data having the first portion concealed.

(Continued)

The unconcealing unit is configured to unconceal the concealed portion of second code data that is generated from the first code data by the linker.

14 Claims, 27 Drawing Sheets

(51) Int. Cl.

| | | |
|---|---|---|
| *H04N 7/16* | (2011.01) | |
| *G06F 21/62* | (2013.01) | |
| *G06F 21/12* | (2013.01) | |
| *G06F 8/70* | (2018.01) | |
| *G06F 9/445* | (2018.01) | |
| *G06F 21/60* | (2013.01) | |
| *G06F 8/54* | (2018.01) | |
| *G06F 21/14* | (2013.01) | |

(52) U.S. Cl.
CPC ............. *G06F 21/12* (2013.01); *G06F 21/14* (2013.01); *G06F 21/602* (2013.01)

(56) References Cited

U.S. PATENT DOCUMENTS

| | | |
|---|---|---|
| 2005/0289397 A1 | 12/2005 | Haruki et al. |
| 2007/0025589 A1* | 2/2007 | Okamoto ............. G06F 21/608 382/100 |
| 2007/0118763 A1* | 5/2007 | Kamei ................. G06F 21/125 713/190 |
| 2011/0296192 A1 | 12/2011 | Hayashi et al. |
| 2012/0066770 A1 | 3/2012 | Hayashi et al. |

FOREIGN PATENT DOCUMENTS

| | | |
|---|---|---|
| JP | 3033562 B2 | 4/2000 |
| JP | 2001-175466 A | 6/2001 |
| JP | 2006-149075 A | 6/2006 |
| JP | 4147472 B2 | 9/2008 |
| JP | 2010-231477 A | 10/2010 |

* cited by examiner

FIG.6

| SECTION NAME SYMBOL | RELOCATED POSITION | POSITION OF CODE BODY IN FILE | SECTION SIZE | POSITION OF RELOCATED INFORMATION | FLAG INFORMATION |
|---|---|---|---|---|---|
| .text | ADDRESS 0020 | ADDRESS 0120 | 0020 BYTES | ADDRESS 0180 | EXECUTABLE CODE, READ-ONLY |
| .data | ADDRESS 1000 | ADDRESS 3000 | 0010 BYTES | ADDRESS 3080 | INITIALIZED DATA |

SECTION INFORMATION 520

FIG.7

| | 531 | 532 | 533 | 534 | 530 |
|---|---|---|---|---|---|
| | SYMBOL | SECTION | SYMBOL INFORMATION OFFSET | TYPE | |
| | symbol1 | SECT1 | 10 BYTES | Static SYMBOL | |
| | symbol2 | SECT2 | 10 BYTES | External SYMBOL | |

CONCEALMENT CONTROL INFORMATION (230)

PORTIONS TO BE CONCEALED

| SYMBOL | OFFSET RANGE |
|---|---|
| symbol1 | 0TH BYTE TO 26TH BYTE |
| symbol1 | 30TH BYTE TO 42ND BYTE |

(b)

CONCEALMENT CONTROL INFORMATION (230)

PORTIONS TO BE CONCEALED

| SYMBOL | OFFSET | SIZE | ENCRYPTION KEY |
|---|---|---|---|
| symbol1 | 0 BYTES | 26 BYTES | 73294332 |
| symbol1 | 30 BYTES | 12 BYTES | 30318776 |

FIG.10

| UNCONCEALING CODE INFORMATION 240 |||
|---|---|---|
| HEAD POSITION OF PORTION TO BE UNCONCEALED || UNCONCEALING CODE |
| SYMBOL | OFFSET | |
| symbol1 | 0 BYTES | code1 |
| symbol1 | 30 BYTES | code3 |

| CONCEALMENT CONTROL INFORMATION | | |
|---|---|---|
| ADDRESS | SIZE | TAG |
| ADDRESS 100 | 26 BYTES | 39461278 |
| ADDRESS 130 | 12 BYTES | 47291023 |

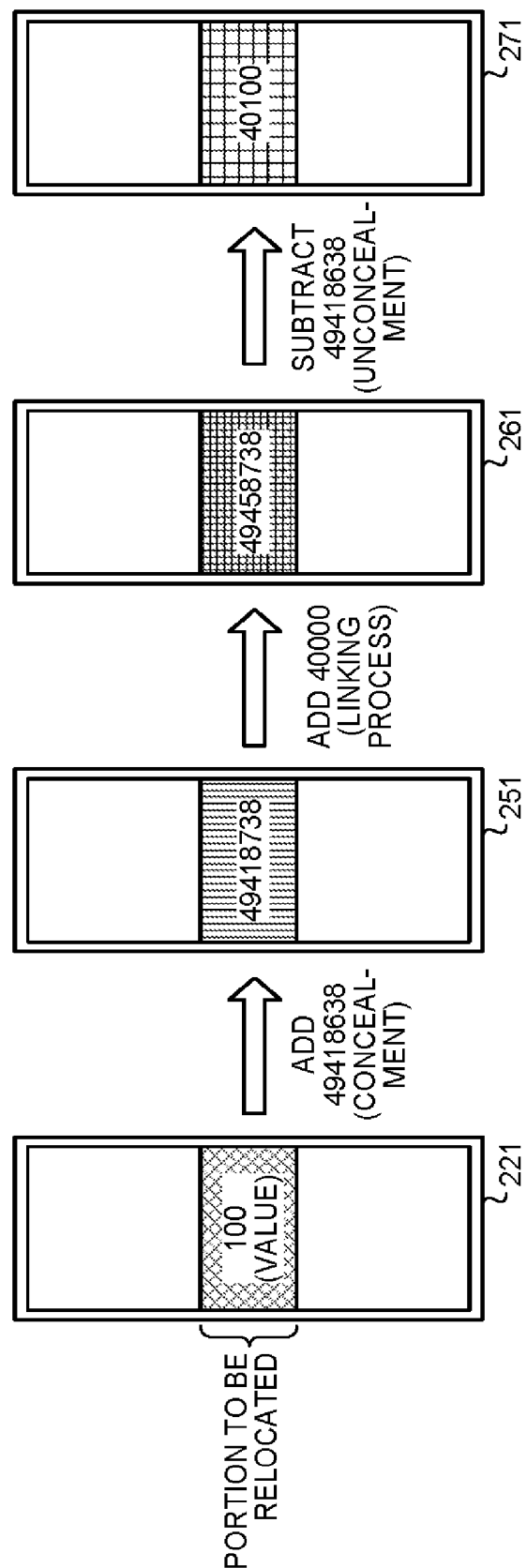

FIG.19

CONCEALMENT CONTROL INFORMATION ⌐230

PORTIONS TO BE CONCEALED | 231 | 232

| SYMBOL | OFFSET | SIZE | CONCEALING METHOD | ENCRYPTION KEY |
|---|---|---|---|---|
| symbol1 | 0 BYTES | 26 BYTES | AES ENCRYPTION | 73294332 |
| symbol1 | 26 BYTES | 4 BYTES | ADDITION-SUBTRACTION CONCEALMENT | 49418638 |
| symbol1 | 30 BYTES | 12 BYTES | AES ENCRYPTION | 30318776 |

CONCEALING METHOD TABLE

| RELOCATION TYPE | CONCEALING METHOD |
|---|---|
| NO RELOCATION | AES ENCRYPTION |
| R_386_32 | ADDITION-SUBTRACTION CONCEALMENT |
| R_386_GOTPC | ADDITION-SUBTRACTION CONCEALMENT |

FIG.28

| ARCHITECTURE | PORTION TO BE CONCEALED | |
|---|---|---|
| x86 | SYMBOL | OFFSET RANGE |
| | symbol1 | 0TH BYTE TO 26TH BYTE |
| | symbol1 | 30TH BYTE TO 42ND BYTE |
| ARM | SYMBOL | OFFSET RANGE |
| | symbol1 | 0TH BYTE TO 20TH BYTE |
| | symbol1 | 28TH BYTE TO 40TH BYTE |

CONCEALMENT CONTROL INFORMATION (235), 661

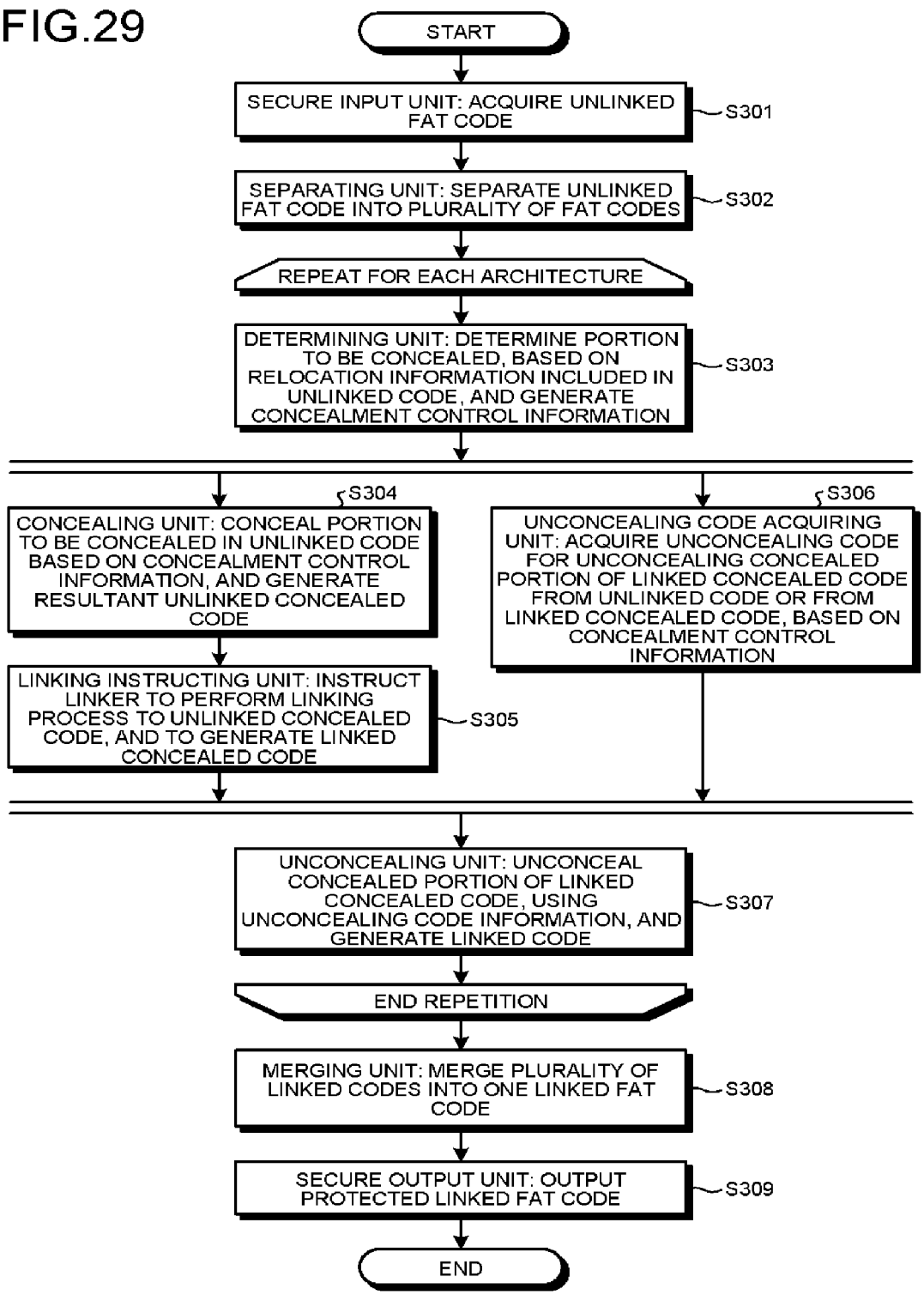

CODE PROCESSING APPARATUS AND COMPUTER PROGRAM PRODUCT

CROSS-REFERENCE TO RELATED APPLICATION

This application is a continuation of PCT international Application Ser. No. PCT/JP2013/057840, filed on Mar. 19, 2013, which designates the United States; the entire contents of which are incorporated herein by reference.

FIELD

Embodiments described herein relate generally to a code processing apparatus and a computer program product.

BACKGROUND

When a plurality of program developers cooperate together to develop a computer program, sometimes it is preferable to conceal a program code developed by a program developer before providing the program code to the other program developers. Let us assume that, as an example, a program developer A delegates a part of his/her development task to a program developer B. While the developer A need to provide a program code he/she developed to the developer B, the developer A may not want to disclose his/her development know-hows or confidential information included in the program code to the developer B.

Encryption is an exemplary way to conceal a program code before providing the code to the other developer. When the developer B uses a general-purpose linker to process the provided program code, however, it is necessary to decrypt the encrypted program code temporarily before inputting the code into the linker, because the general-purpose linker is incapable of processing an encrypted program code. In such a case, because the program code is temporarily decrypted, the developer B is allowed to access the program code, and the objective mentioned above cannot be achieved. Another solution to this problem is asking the developer B to use a special linker capable of accepting an encrypted file to process the program code that is developed and encrypted by the developer A. In such a case, however, because the linker itself needs to be modified, extra development burdens are imposed. Furthermore, such a special linker is not acceptable in an environment where such a special linker cannot be used.

BRIEF DESCRIPTION OF THE DRAWINGS

FIG. 6 is a schematic illustrating an example of section information.

FIG. 7 is a schematic illustrating an example of symbol information.

FIG. 8 is a schematic illustrating specific examples of concealment control information.

FIG. 10 is a schematic illustrating a specific example of unconcealing code information.

FIG. 15 is a schematic illustrating a specific example of the concealment control information.

FIG. 18 is a schematic for explaining a specific example of a calculation performed with addition-subtraction concealment.

FIG. 19 is a schematic illustrating a specific example of the concealment control information.

FIG. 20 is a schematic illustrating a specific example of a concealment scheme table.

FIG. 28 is a schematic illustrating a specific example of the concealment control information.

FIG. 29 is a flowchart illustrating a process performed by the code processing apparatus.

DETAILED DESCRIPTION

According to an embodiment, a code processing apparatus includes a determining unit, a concealing unit, an instructing unit, and an unconcealing unit. The determining unit is configured to determine, based on relocation information included in first code data that includes a code body and relocation information representing a portion of the code body to be relocated by a linker, a first portion including at least a part of the code body that is other than the portion. The concealing unit is configured to conceal the first portion. The instructing unit is configured to instruct the linker to process the first code data having the first portion concealed. The unconcealing unit is configured to unconceal the concealed portion of second code data that is generated from the first code data by the linker.

The code processing apparatus according to one embodiment is an apparatus intended to acquire second code data by causing an external linker to process first code data while keeping the codes concealed. The code processing apparatus according to the embodiment, for example, receives an input of protected first code data, and causes an external linker to process the first code data having the protection removed but partially including a concealed portion. The code processing apparatus according to the embodiment then unconceals the concealed portion of the second code data having been acquired by causing the external linker to process the first code data, protects the unconcealed second code data, and outputs the protected unconcealed second code data. With the code processing apparatus according to the embodiment, when a developer A and a developer B cooperate together to develop a computer program, for example, the first code data that is a program code developed by the developer A can be provided to the developer B without disclosing the first code data to the developer B, and the developer B can generate the second code data by processing the first code data with a general-purpose linker. In the explanation hereunder, the first code data is referred to as an "unlinked code", and the protected first code data is referred to as "protected unlinked code". The first code data partially having a concealed portion is referred to as an "unlinked concealed code", and the second code data acquired from the external linker is referred to as a "linked concealed code". The second code data having the concealed portion unconcealed is referred to as a "linked code", and the second code data under protection is referred to as a "protected linked code". The plaintext code corresponding to the concealed portion is referred to as an "original code".

First Embodiment

Figure 1:
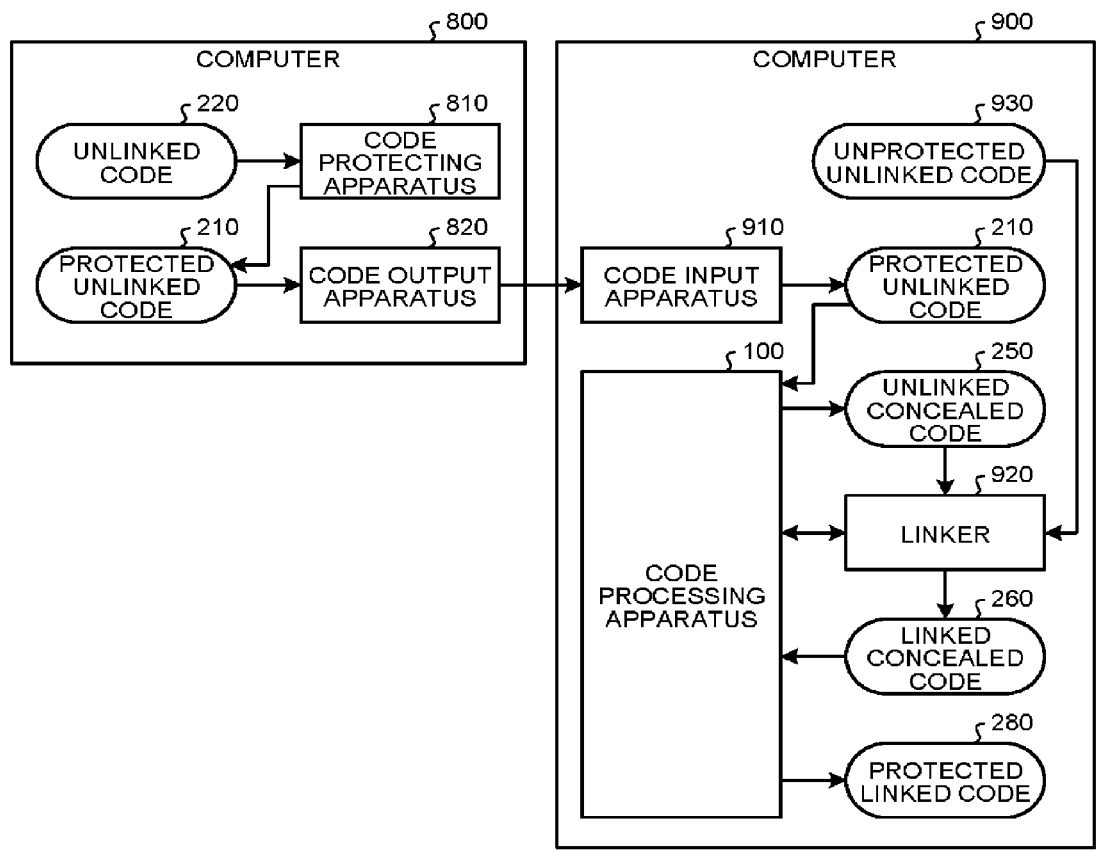
FIG. 1 is a block diagram illustrating an exemplary configuration of a computer program development system according to a first embodiment of the present invention.

FIG. 1 is a block diagram illustrating an exemplary configuration of a computer program development system according to a first embodiment of the present invention. The computer program development system according to the first embodiment includes a computer 800 used by a developer A and a computer 900 used by a developer B, as illustrated in FIG. 1. The developer A and the developer B are developers who cooperate together to develop a computer program. The developer A develops a program code using the computer 800. The developer B develops an executable program code using the computer 900, based on the program code developed by the developer A.

The computer 800 used by the developer A includes a code protecting apparatus 810 and a code output apparatus 820.

The code protecting apparatus 810 generates a protected unlinked code 210 by applying protection to an unlinked code 220 having been developed by the developer A. Protection herein is a process for prohibiting the actual program code from being easily known. An example of the protection includes encryption of the program code so that the developer B is prohibited from knowing the program code. The protection may also be a process of setting access control to a file including the program code (that is, a process without any modification of the program code) so that the developer B is prohibited from gaining a direct access to the program code. The protection may protect only a part of the program code that the developer A considers should not be known to the developer B.

The code output apparatus 820 outputs a protected unlinked code 210 generated by the code protecting apparatus 810. Outputting herein means a process of taking out the protected unlinked code 210 from the computer 800 so as to make the protected unlinked code 210 available to the computer 900. Outputting herein may be an email transmission over a computer network, a file transfer via a file server over a computer network, or a file transfer exchanged between computers shared over a network file system, for example. Outputting may be storing of the protected unlinked code 210 in a removable storage medium, without any transmission over a computer network.

The computer 900 used by the developer B includes a code input apparatus 910, a linker 920, and a code processing apparatus 100 according to the first embodiment.

The code input apparatus 910 receives an input of the protected unlinked code 210 output from the code output apparatus 820. Receiving an input herein is a process of making the protected unlinked code 210 output from the code output apparatus 820 available to the computer 900. Receiving an input is a process corresponding to outputting described above, and is reception of an email, reception of a file via a file server, or reading from a removable storage medium, for example.

The code processing apparatus 100 cooperates with the external linker 920 to generate a protected linked code 280 from the protected unlinked code 210 received via the code input apparatus 910. The code processing apparatus 100 will be described later in detail.

The linker 920 converts the program code so as to make the program code executable. For example, the linker 920 processes one or more program codes, links the program codes together if the program codes are in plurality, and generates one executable program code. Hereinafter, the process performed by the linker 920 is referred to as a linking process. Illustrated in FIG. 1 is an example in which the linker 920 links an unlinked concealed code 250 to an unprotected unlinked code 930, and outputs a linked concealed code 260. In the linking process, the linker 920 sometimes rewrites a portion of the program code so that the linked program code operates normally. For example, a program code is sometimes assigned with addresses allowing positions to be identified, but such addresses may be changed before and after the linking process. In such a case, the linker 920 performs a process of changing the addresses used in the program code so that the operation of the program code is not affected by the address change. This process is called relocation.

The linker 920 may be any general-purpose linker that is widely used in developing computer programs. Well-known examples of general-purpose linkers widely used in computer program development include GNU ld for the software development on Linux (a registered trademark of Linus Torvalds), and LINK.exe for software development on Windows (a registered trademark of Microsoft Corporation), and these may be used as the linker 920.

The unlinked code 220 is a program code that is developed by the developer A, and is a program code to which the linker 920 may perform the linking process. A program code includes information such as instructions for causing a computer to execute a process, and related data. A program code may be a machine-language code executed by a processor architecture such as x86, or may be in an intermediary language such as Java (a registered trademark of Oracle Corporation) bytecode, or may be a code in a script language such as JavaScript (a registered trademark of Oracle Corporation). Hereinafter, a program code generated by the linking process is referred to as a linked code.

The protected unlinked code 210 is a program code generated by the code protecting apparatus 810 applying protection to the unlinked code 220. The protected unlinked code 210 may be in a format not allowing the linker 920 to perform the linking process.

The unlinked concealed code 250 is a program code including a concealed part, but in a format permitting the linker 920 to perform the linking process. Concealing herein is a process of partially concealing a portion of the code (hereinafter, referred to as a portion to be concealed) so that such a portion cannot be easily known, but in a manner allowing the general-purpose linker 920 to process the program code applied with concealment. Concealing may be a process of encrypting a portion to be concealed of the code, or a process of replacing the original code in the portion to be concealed of the code with a dummy code (random numbers, zeros, or other fixed values), for example.

The linked concealed code 260 is a program code acquired by causing the linker 920 to perform the linking process to the unlinked concealed code 250, and is a linked code partially including a portion to be concealed. Computers are incapable of parsing and executing the linked concealed code 260 as it is.

The protected linked code 280 is a linked code under protection. Protection herein is the same as the protection applied by the code protecting apparatus 810, but does not necessarily need to be the same as that applied to the unlinked code 220. The computer 900 used by the developer B may be or may not be capable of parsing and executing the protected linked code 280. The unlinked concealed code 250 and the linked concealed code 260 may be stored in a format easily accessed by the developer B.

The unprotected unlinked code 930 is a program code that is developed by the developer B, and is a program code to which the linker 920 may perform the linking process. Because the unprotected unlinked code 930 is a program code developed by the developer B, neither the protection nor the concealment is required. In this embodiment, a program code is sometimes simply referred to as a code.

Figure 2:
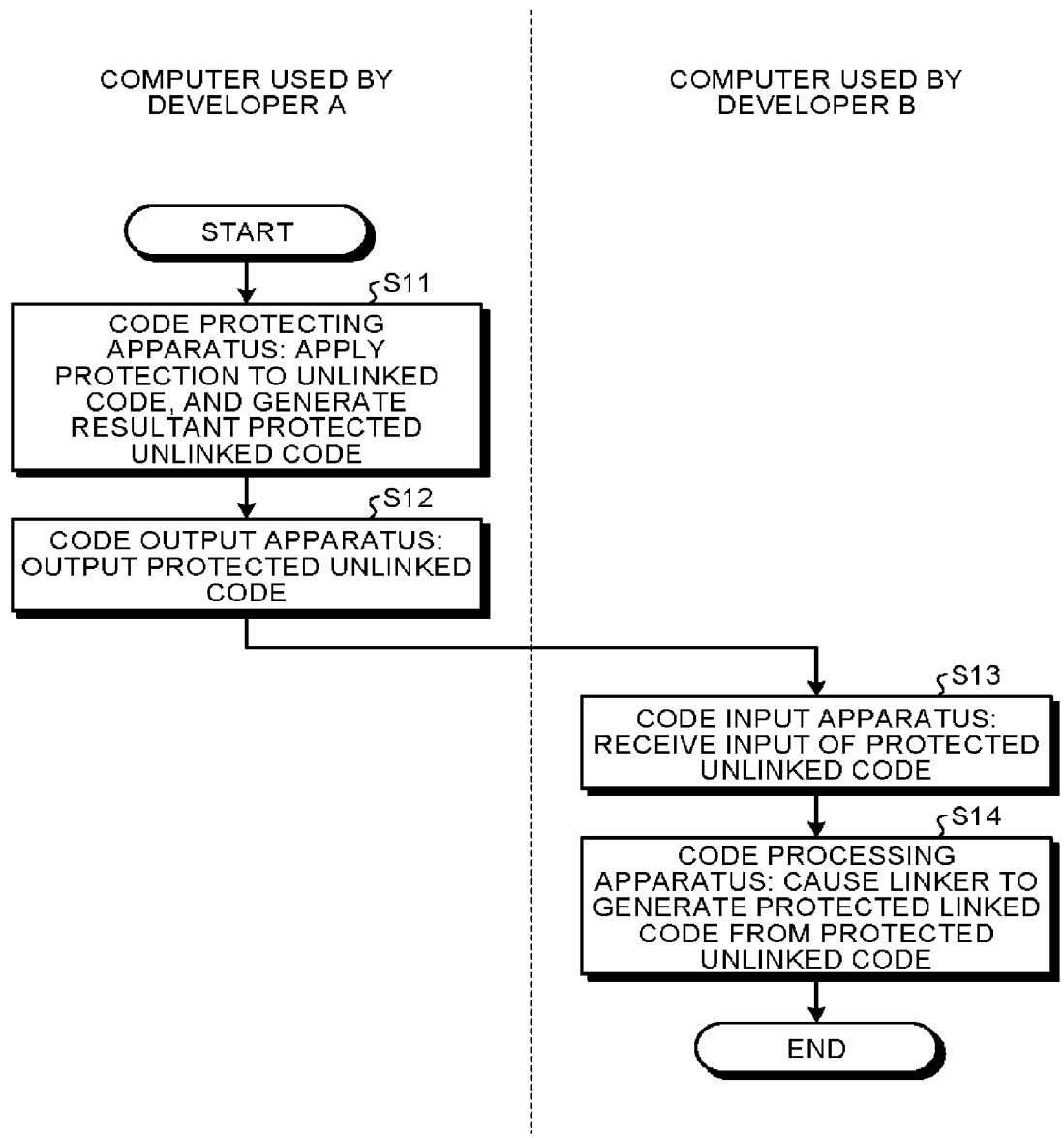
FIG. 2 is a flowchart illustrating a process performed by the computer program development system.

A process performed by the computer program development system according to the first embodiment will now be explained. FIG. 2 is a flowchart illustrating a process performed by the computer program development system illustrated in FIG. 1. The computer 800 of the developer A performs the processes at Step S11 and Step S12, in response to an operation performed by the developer A. The computer 900 of the developer B then performs the process at Step S13 and Step S14 in response to an operation performed by the developer B.

At Step S11, the code protecting apparatus 810 in the computer 800 generates the resultant protected unlinked code 210 by applying the protection to the unlinked code 220. For example, the code protecting apparatus 810 generates the protected unlinked code 210 by encrypting the unlinked code 220. This protected unlinked code 210 is in a format that can be decrypted by the code processing apparatus 100 in the computer 900.

At Step S12, the code output apparatus 820 in the computer 800 outputs the protected unlinked code 210 so as to make the protected unlinked code 210 available to the computer 900.

At Step S13, the code input apparatus 910 in the computer 900 receives the input of the protected unlinked code 210 output from the computer 800.

At Step S14, the code processing apparatus 100 in the computer 900 generates the protected linked code 280 from the protected unlinked code 210 using the linker 920. Specifically, the code processing apparatus 100 generates the unlinked concealed code 250 from the protected unlinked code 210, in a format that can be processed by the linker 920, and instructs the linker 920 to process the unlinked concealed code 250. The linker 920 then receives an input of the unlinked concealed code 250 and the unprotected unlinked code 930 that is developed by the developer B, and performs the linking process to the unlinked codes. As a result, the linked concealed code 260 is generated. It is not a requirement, however, that linking process is applied to the unprotected unlinked code 930. The code processing apparatus 100 then unconceals and protects the linked concealed code 260, and outputs the protected linked code 280.

Figure 3:
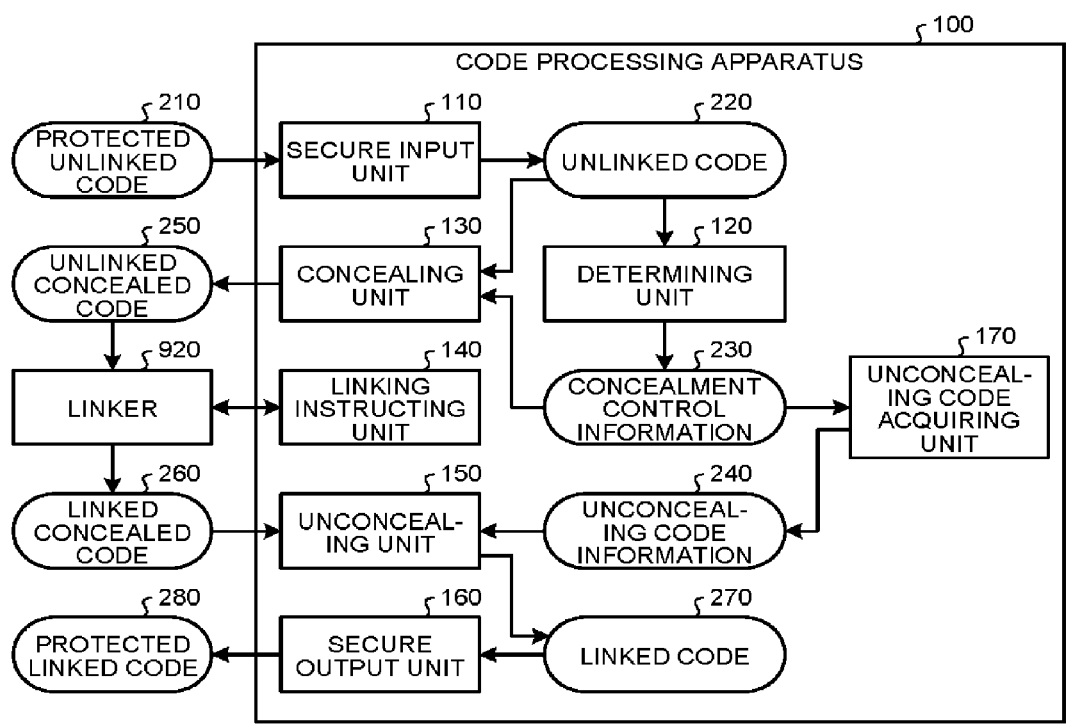
FIG. 3 is a block diagram illustrating an exemplary configuration of the code processing apparatus according to the first embodiment.

The code processing apparatus 100 according to the first embodiment will now be explained in detail. FIG. 3 is a block diagram illustrating an exemplary configuration of the code processing apparatus 100 according to the first embodiment. The code processing apparatus 100 according to the first embodiment includes a secure input unit 110, a determining unit 120, a concealing unit 130, a linking instructing unit 140, an unconcealing unit 150, a secure output unit 160, and an unconcealing code acquiring unit 170, as illustrated in FIG. 3.

The secure input unit 110 receives an input of the protected unlinked code 210, and removes the protection, to acquire the unlinked code 220. Removing the protection herein is a process of acquiring the data not applied with the protection, from the data applied with the protection. For example, when the data is protected by encryption, the data is decrypted to remove the protection. When the data is protected by setting access control, the secure input unit 110 reads the data using an access privilege required to access the data, to remove the protection.

The determining unit 120 determines a portion to be concealed that includes at least a part of the unlinked code 220 but does not include a portion to be relocated, based on relocation information described later, included in the unlinked code 220. The determining unit 120 then generates concealment control information 230 indicating the determined portion to be concealed.

The concealing unit 130 generates the unlinked concealed code 250 by concealing the portion to be concealed in the unlinked code 220 based on the concealment control information 230.

The linking instructing unit 140 designates the unlinked concealed code 250 as a code to be processed, and instructs the linker 920 to perform the linking process to the unlinked concealed code 250. The linked concealed code 260 is acquired as a result of the linker 920 performing the linking process to the unlinked concealed code 250, in response to the instruction from the linking instructing unit 140.

The unconcealing code acquiring unit 170 acquires the unconcealing code for unconcealing the concealed portion of the linked concealed code 260 from the unlinked code 220 or the linked concealed code 260, based on the concealment control information 230, and generates unconcealing code information 240 indicating the acquired unconcealing code and pointing to the position to be unconcealed.

The unconcealing unit 150 generates the linked code 270 by unconcealing the linked concealed code 260 based on the unconcealing code information 240. Unconcealing herein is a process of unconcealing the data from the concealed data, and an example of the unconcealment is a process of overwriting the concealed portion of the linked concealed code 260 with the corresponding unconcealing code. If the concealed portion is concealed by encryption, the unconcealing code acquiring unit 170 acquires unconcealing data by decrypting the encrypted portion of the linked concealed code 260, and the unconcealing unit 150 unconceals the concealed portion in the linked concealed code 260 using the unconcealing data. If the concealed portion is concealed by replacement with a dummy code, the unconcealing code acquiring unit 170 acquires the original code of the concealed portion from the unlinked code 220 as the unconcealing code, and the unconcealing unit 150 unconceals the concealed portion of the linked concealed code 260 using the unconcealing data.

The secure output unit 160 generates the protected linked code 280 by applying the protection to the linked code 270, and outputs the protected linked code 280.

Figure 4:
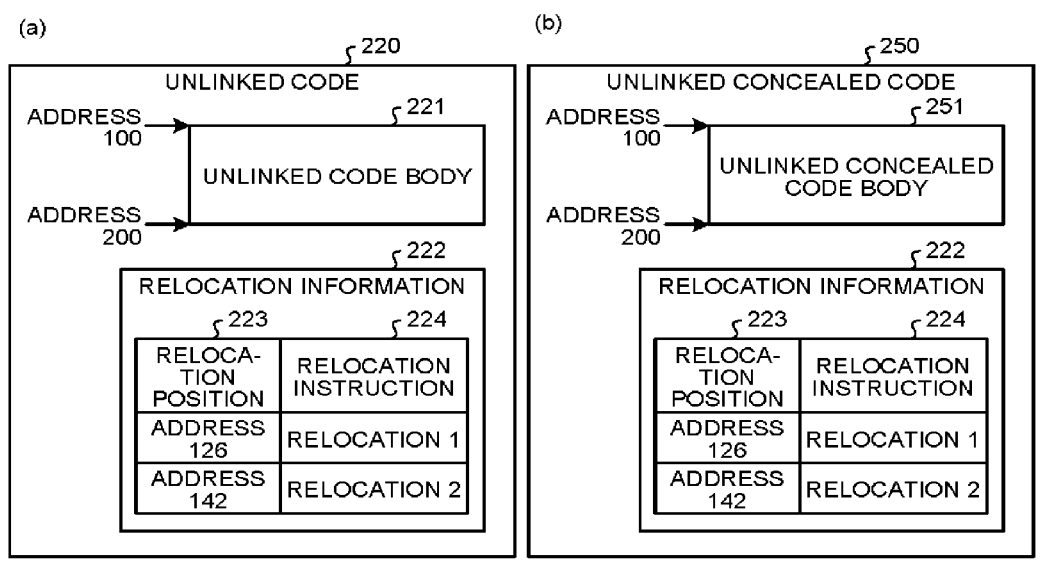
FIG. 4 is a schematic for explaining an unlinked code and an unlinked concealed code.

The unlinked code 220 and the unlinked concealed code 250 will now be explained more specifically, with reference to FIG. 4. FIG. 4 is a schematic for explaining the unlinked code 220 and the unlinked concealed code 250. FIG. 4(a) illustrates the unlinked code 220, and FIG. 4(b) illustrates the unlinked concealed code 250.

The unlinked code 220 is a program code to which the linker 920 may perform the linking process, as mentioned earlier. The unlinked code 220 includes an unlinked code body 221 and relocation information 222, as illustrated in FIG. 4(a).

The unlinked code body 221 includes instructions for actually causing a computer to execute a process, and related data. The unlinked code body 221 may be provided with addresses such as an address of 100 and an address of 200, as illustrated in FIG. 4(a), for enabling a position in the code to be pointed. An address is a number pointing to a position in the code.

The relocation information 222 is information indicating a portion of the unlinked code body 221 to be relocated by the linker 920. The relocation is a process of rewriting an undetermined portion of the code, being undetermined before the linking process, during the linking process. In the example illustrated in FIG. 4(a), the relocation is a process of rewriting a predetermined portion (portion to be relocated) of the unlinked code body 221 in response to a relocation instruction 224, the portion starting at the position pointed by a relocation position 223. The relocation position 223 is information pointing to the position of a portion to be relocated in the unlinked code body 221. In the example illustrated in FIG. 4(a), a predetermined range from an address of 126 and a predetermined range from an address of 142 in the unlinked code body 221 are indicated as portions to be relocated. A relocation instruction 224 is information for instructing how the linker 920 should rewrite the portion to be relocated during the relocation, and has a meaning such as "add a constant number 10 to the value at the target position". In the example illustrated in FIG. 4(a), the relocation instruction 224 is information instructing the linker 920 to rewrite the portion to be relocated starting from an address of 126 based on the method specified as "relocation 1", and to rewrite the portion to be relocated starting from an address of 142 based on the method specified as "relocation 2".

A specific example of the relocation instruction 224 will now be explained more in detail. A RELA-type relocation instruction for Executable and Linkable Format (ELF) used on Linux (registered trademark) contains a relocation type, a symbol, and an addend, for example. The symbol is information for identifying a position in the code. When x86 is used as the instruction set architecture (ISA), as an example, the relocation instruction specified with a relocation type of "R_386_32", a symbol of "xyz", and an addend of "10" implements an instruction to "store a value generated by adding 10 to the address at the symbol xyz in the portion to be relocated". A general-purpose linker such as GNU ld mentioned above writes information following such an instruction during the linking process.

The unlinked concealed code 250 is a program code generated by the concealing unit 130 concealing the portion to be concealed in the unlinked code body 221, the portion to be concealed being determined by the determining unit 120, included in the unlinked code 220. The unlinked concealed code 250 includes an unlinked concealed code body 251 and relocation information 222, as illustrated in FIG. 4(b). The unlinked concealed code 250 will be described later in detail. The relocation information 222 is the same as the relocation information 222 included in the unlinked code 220. The relocation information 222 in the unlinked concealed code 250 does not necessarily need to be matched with the relocation information 222 in the unlinked code 220, and may be partially changed depending on the linker 920 in use, for example.

An exemplary specific format of the unlinked code 220 is disclosed in the cited literature below. The unlinked code 220 corresponds to a file in the Common Object File Format (COFF) disclosed in the following cited literature.

Cited literature: Microsoft Portable Executable and Common Object File Format Specification Revision 8.2-Sep. 21, 2010.

Figure 5:
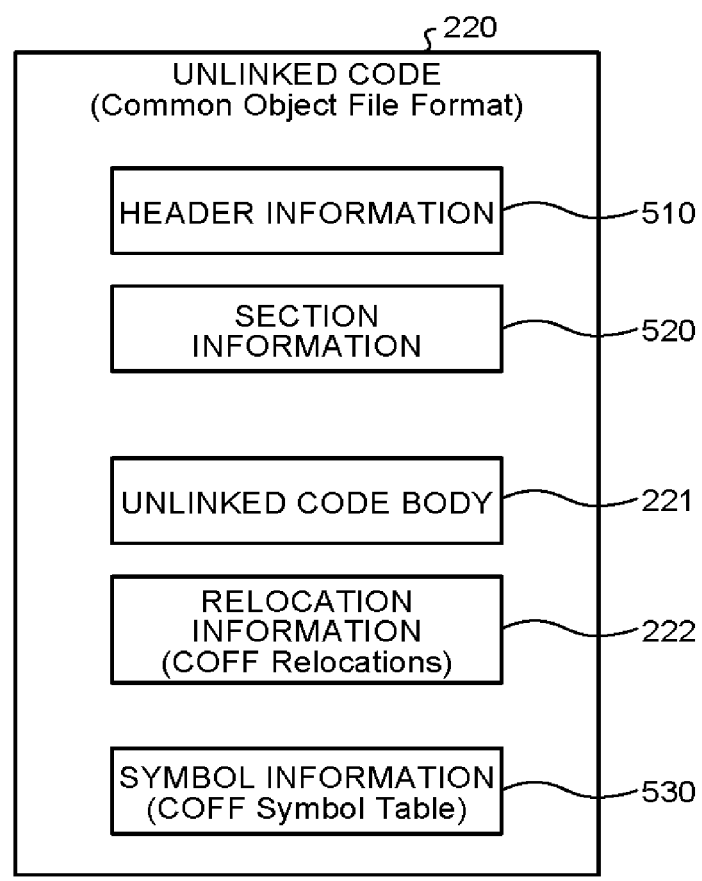
FIG. 5 is a schematic for explaining a data structure of the unlinked code disclosed in the cited literature.

FIG. 5 is a schematic for explaining the data structure of the unlinked code 220 disclosed in the cited literature. According to the cited literature, an unlinked code 220 includes header information 510, section information 520, an unlinked code body 221, relocation information 222, and symbol information 530. The unlinked code 220 contains one or more unlinked code bodies 221 and one or more pieces of relocation information 222, depending on what is specified in the section information 520.

The header information 510 is an area for management information that retains information such as locations where the objects making up the unlinked code 220 are located in a file.

The section information 520 is meta-information related to a section in the code. A section is a unit in which information is stored in a file. According to the COFF, each of the code body 221, the relocation information 222, and the like is stored as one section. FIG. 6 is a schematic illustrating an example of the section information 520. The section information 520 retains a section name symbol 521, a relocated position 522, a position 523 of the code body in the file, a section size 524, a position of relocated information 525, and flag information 526, as a list, as illustrated in FIG. 6.

The symbol information 530 is information storing therein one or more symbols. A symbol is meta-information given to a code, in order to point to the position in a computer program, for example. FIG. 7 is a schematic illustrating an example of the symbol information 530. The symbol information 530 retains a symbol 531, a section 532, an offset 533, and a type 534 as a list, as illustrated in FIG. 7.

The concealment control information 230 generated by the determining unit 120 will now be explained more in detail with reference to FIG. 8. FIG. 8 is a schematic illustrating specific examples of the concealment control information 230. FIG. 8(a) illustrates an example of the concealment control information 230, and FIG. 8(b) illustrates another example of the concealment control information 230.

The concealment control information 230 is information representing a portion to be concealed determined by the determining unit 120. The concealment control information 230 is used when the concealing unit 130 conceals the unlinked code 220, and when the unconcealing code acquiring unit 170 generates the unconcealing code information 240. In the examples illustrated in FIGS. 8(a) and 8(b), the concealment control information 230 specifies the portions to be concealed as a list of continuous ranges. Although the concealment control information 230 is specified differently in the examples illustrated in FIGS. 8(a) and 8(b), both of these examples specify a portion at an offset of "the 0th byte to the 26th byte" from symbol "symbol1", and a portion at an offset of "the 30th byte to the 42nd byte" from the symbol "symbol1", as the portions to be concealed. Although the portion to be concealed is specified as an offset from a symbol in the examples illustrated in FIGS. 8(a) and 8(b), a portion to be concealed may be specified using the address information instead. In addition, when a portion to be concealed is concealed by encryption, for example, an encryption key used for the encryption, other information related to the encryption algorithm, and the like may be included in the concealment control information 230, as illustrated in FIG. 8(b).

Figure 9:
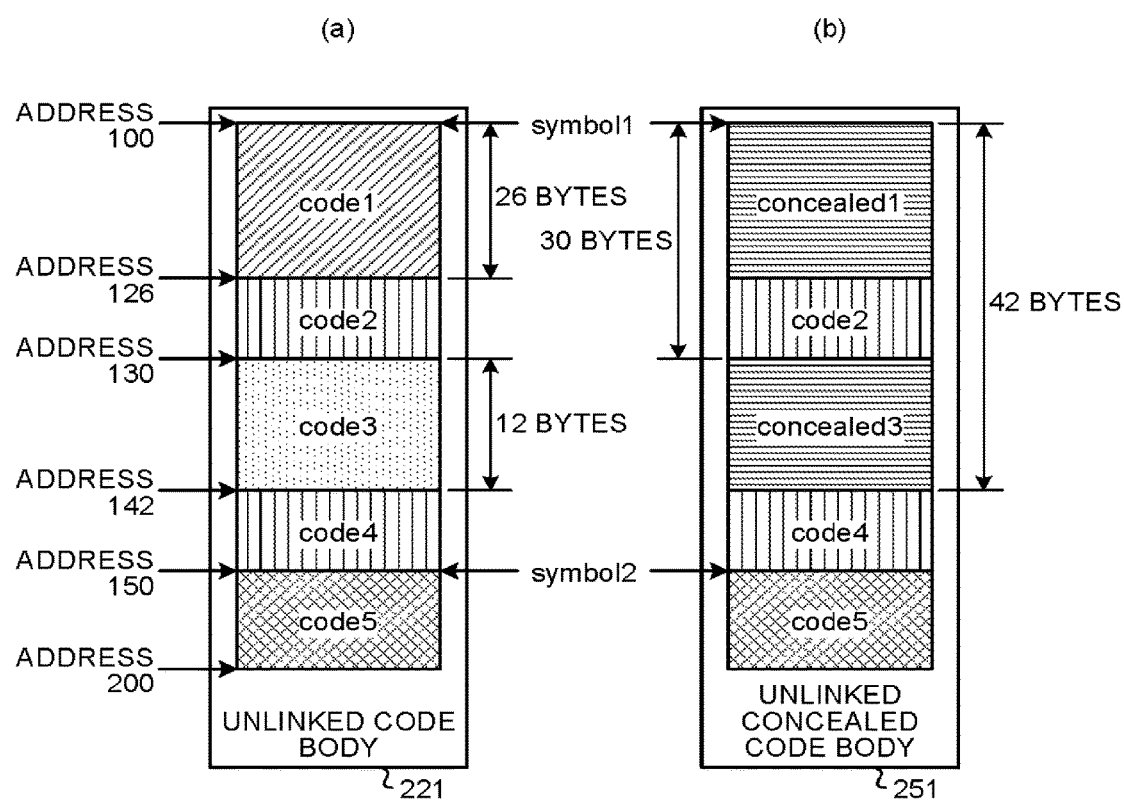
FIG. 9 is a schematic illustrating a specific example of an unlinked code body and an unlinked concealed code body.

Specific examples of the unlinked code body 221 included in the unlinked code 220 and the unlinked concealed code body 251 included in the unlinked concealed code 250 will now be explained more in detail with reference to FIG. 9. FIG. 9 is a schematic illustrating specific examples of the unlinked code body 221 and the unlinked concealed code body 251. FIG. 9(a) illustrates an example of the unlinked code body 221, and FIG. 9(b) illustrates an example of the unlinked concealed code body 251.

The unlinked code body 221 illustrated in FIG. 9(a) includes codes "code1" and "code3" that are portions to be concealed, codes "code2" and "code4" that are portions to be relocated, and a code "code5" that is a portion not to be relocated and is designated as not to be concealed by the developer A, for example. The portion to be concealed is determined by the determining unit 120 in the code processing apparatus 100, and the concealment control information 230 points to the position of the portion to be concealed in the unlinked code body 221. The unlinked code body 221 illustrated in FIG. 9(a) has a symbol "symbol1" at an address of 100, and a symbol "symbol2" at an address of 150.

The unlinked concealed code body 251 illustrated in FIG. 9(b) includes concealed codes "concealed1" and "concealed3", codes "code2" and "code4" that are portions to be relocated, and a "code5" that is a portion not relocated and is designated as not to be concealed by the developer A, for example. A concealed code is a code with information from which the original code cannot be easily known (the codes "code1" and "code3" in the portions to be concealed in FIG. 9(a)). A concealed code may be an encryption of the original code, or may be a dummy code. A dummy code is a code almost or completely unrelated to the original code. A dummy code may be a no-operation (NOP) instruction, or a meaningless code such as an enumeration of code "0" or random numbers, or may be a meaningful but unrelated code with respect to the original code.

The unlinked concealed code body 251 illustrated in FIG. 9(b) is different from the unlinked code body 221 illustrated in FIG. 9(a) in that the code "code1" ranging from an address of 100 to an address of 126 is replaced with the concealed code "concealed1", and the "code3" ranging from an address of 130 to an address of 142 is replaced with the concealed code "concealed3". These codes are replaced by the concealing unit 130 in the code processing apparatus 100, based on the concealment control information 230. It is therefore impossible or extremely difficult to know the contents of the codes "code1" and the "code3" included in the unlinked code body 221, solely with the information in the unlinked concealed code body 251. Because, in the example of the unlinked code body 221 illustrated in FIG. 9(a), the codes "code2", "code4", and "code5" are portions not concealed, these codes remain unreplaced with concealed codes, in the unlinked concealed code body 251 illustrated in FIG. 9(b).

An specific example of the unconcealing code information 240 generated by the unconcealing code acquiring unit 170 will now be explained more in detail with reference to FIG. 10. FIG. 10 is a schematic illustrating a specific example of the unconcealing code information 240.

The unconcealing code information 240 is information instructing to overwrite the linked concealed code 260 with a code so as to unconceal the concealed code. The unconcealing code information 240 includes a code (unconcealing code) with which the concealed code is overwritten. The exemplary unconcealing code information 240 illustrated in FIG. 10 includes unconcealing codes that are the same as the codes "code1" and "code3" (original codes) to be concealed in the unlinked code body 221 illustrated in FIG. 9(a). An unconcealing code is retained in a manner mapped to the concealed portion that is to be unconcealed with the unconcealing code (a portion to be unconcealed) in the linked concealed code 260, that is, mapped to the head position of the concealed portion in the linked concealed code 260. A symbol and an offset, for example, are used to point to the head position of a portion to be unconcealed. In the example illustrated in FIG. 10, the position at an offset of "0 bytes" from the symbol "symbol1" is the head position of the portion to be unconcealed that is to be overwritten with the unconcealing code "code1", and the position at an offset of "30 bytes" from the symbol "symbol1" is the head position of the portion to be unconcealed that is to be overwritten with the unconcealing code "code3".

Figure 11:
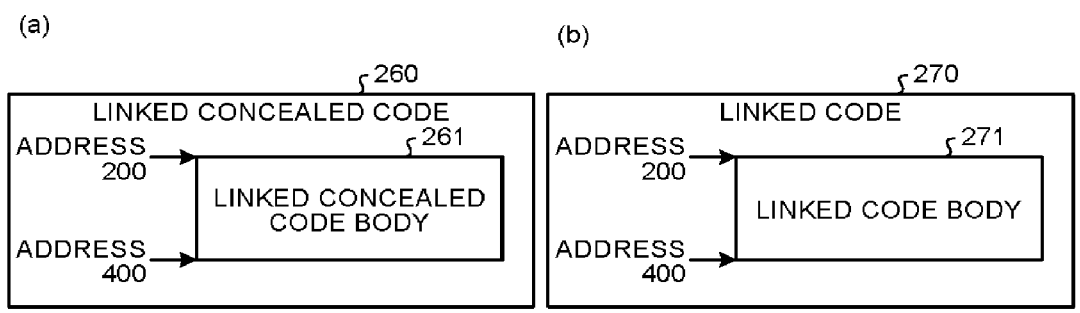
FIG. 11 is a schematic for explaining a linked concealed code and a linked code.

The linked concealed code 260 and the linked code 270 will now be explained more in detail with reference to FIG. 11. FIG. 11 is a schematic for explaining data structures of the linked concealed code 260 and the linked code 270. FIG. 11(a) illustrates the linked concealed code 260, and FIG. 11(b) illustrates the linked code 270.

The linked concealed code 260 illustrated in FIG. 11(a) is a code generated by the linker 920 performing the linking process to the unlinked concealed code 250, and includes a linked concealed code body 261. The linked code 270 illustrated in FIG. 11(b) is a code acquired by the unconcealing unit 150 in the code processing apparatus 100 unconcealing the concealed portion (portion to be unconcealed) of the concealed code body 261 in the linked concealed code 260, and includes a linked code body 271.

The cited literature mentioned above discloses a known example of a specific format for the linked code 270. The linked code 270 corresponds to a file in Portable Executable format disclosed in the cited literature.

Figure 12:
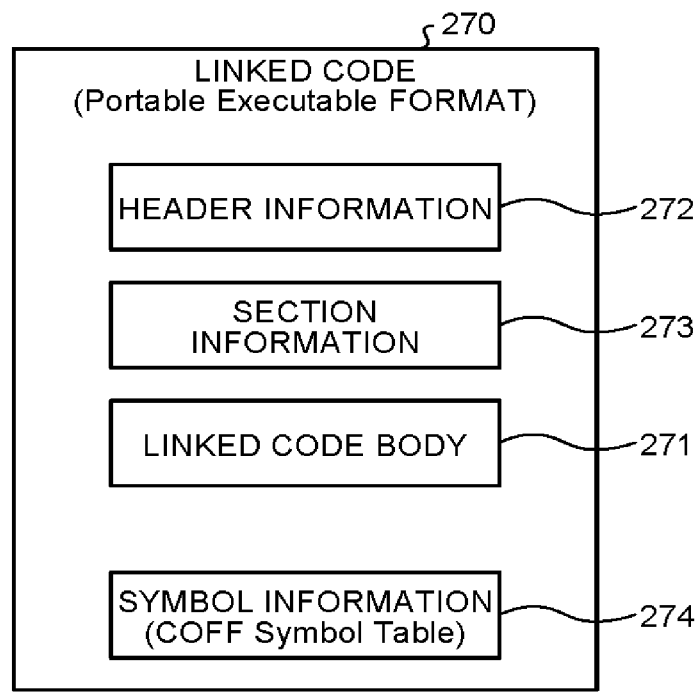
FIG. 12 is a schematic for explaining a data structure of the linked code disclosed in a cited literature.

FIG. 12 is a schematic for explaining a data structure of the linked code 270, as disclosed in the cited literature. According to the cited literature, the linked code 270 includes header information 272, section information 273, a linked code body 271, and symbol information 274. The header information 272 is an area for management information that retains information such as the locations where the objects making up the linked code 270 are located in a file, and the position where execution of the computer program is started. The section information 273 and the symbol information 274 are the same as the section information 520 and the symbol information 530 included in the unlinked code 220 illustrated in FIG. 5. The symbol information 274 is not necessarily needed to be included in the linked code 270, and the linker 920 may output the symbol information 274 to an external file. The symbol information 274 output from the linker 920 may be a map file in a legible text, or may be a file with an extension such as SYM or PDB.

Figure 13:
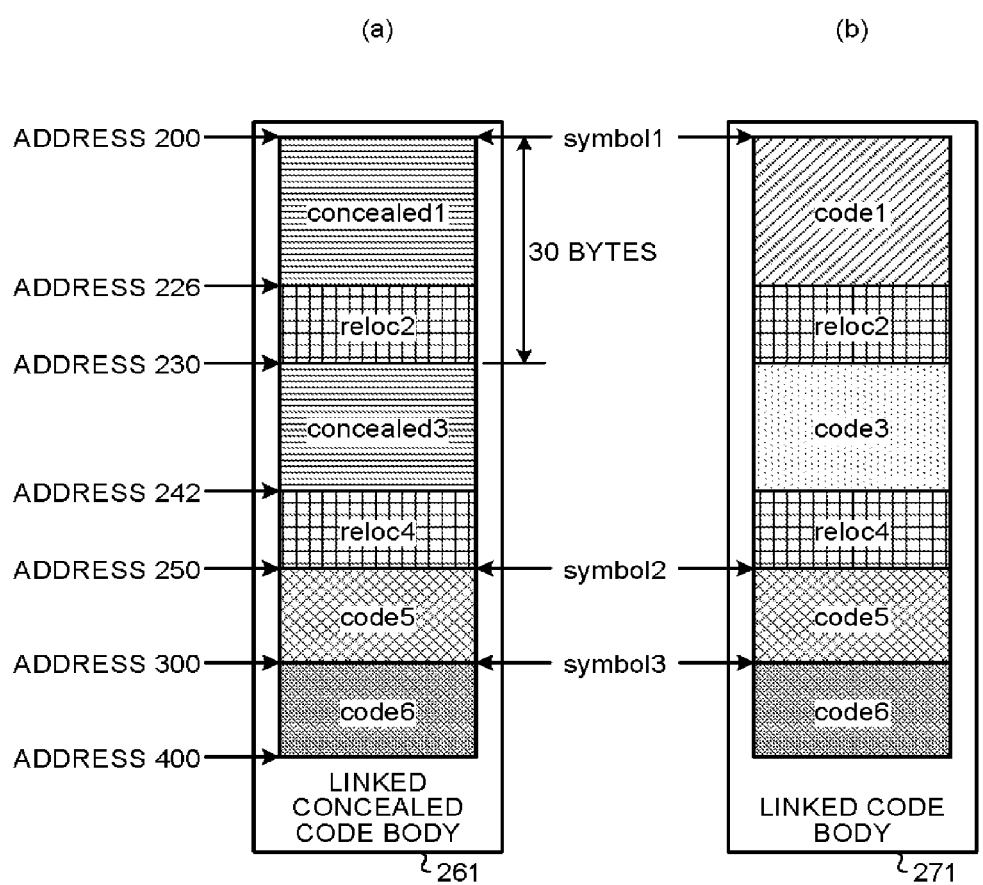
FIG. 13 is a schematic illustrating a specific example of a linked concealed code body and a linked code body.

Specific examples of the linked concealed code body 261 in the linked concealed code 260 and the linked code body 271 in the linked code 270 will now be explained more in detail with reference to FIG. 13. FIG. 13 is a schematic illustrating specific examples of the linked concealed code body 261 and the linked code body 271. FIG. 13(a) illustrates an example of the linked concealed code body 261, and FIG. 13(b) illustrates an example of the linked code body 271.

The linked concealed code body 261 illustrated in FIG. 13(a) includes the concealed codes "concealed1" and "concealed3", codes "reloc2" and "reloc4" rewritten by the linker 920 performing the relocation during the linking process, the code "code5" designated as not being a portion to be concealed by the developer A, for example, and a code "code6" derived from another object linked by the linker 920 in the linking process. The linked concealed code body 261 illustrated in FIG. 13(a) has a symbol "symbol1" at an address of 200, has a symbol "symbol2" at an address of 250, and has a symbol "symbol3" at an address of 300.

Compared with the unlinked concealed code body 251 illustrated in FIG. 9(b), the linked concealed code body 261 illustrated in FIG. 13(a) has the addresses of the respective codes incremented by 100, has the code "code2" replaced with the code "reloc2", the "code4" replaced with the code "reloc4", and has the additional "code6". The change in the addresses and the addition of the "code6", in comparison with the unlinked concealed code 250, are resultant of events in the linking process performed by the linker 920, and are not essential for the linked concealed code body 261.

The linked code body 271 is a code resultant of unconcealing the concealed code portion (the portion to be unconcealed) of the linked concealed code body 261. Unconcealing herein is a process of bringing the concealed code back to the original. The linked code body 271 illustrated in FIG. 13(b) is a code resultant of unconcealing the portions to be unconcealed in the linked concealed code body 261 illustrated in FIG. 13(a), and includes the codes "code1", "reloc2", "code3", "reloc4", "code5", and "code6". The linked code body 271 illustrated in FIG. 13(b) is different from the linked concealed code body 261 illustrated in FIG. 13(a) in that the concealed codes "concealed1" and "concealed3" are unconcealed to the original codes "code1" and "code3", respectively.

Figure 14:
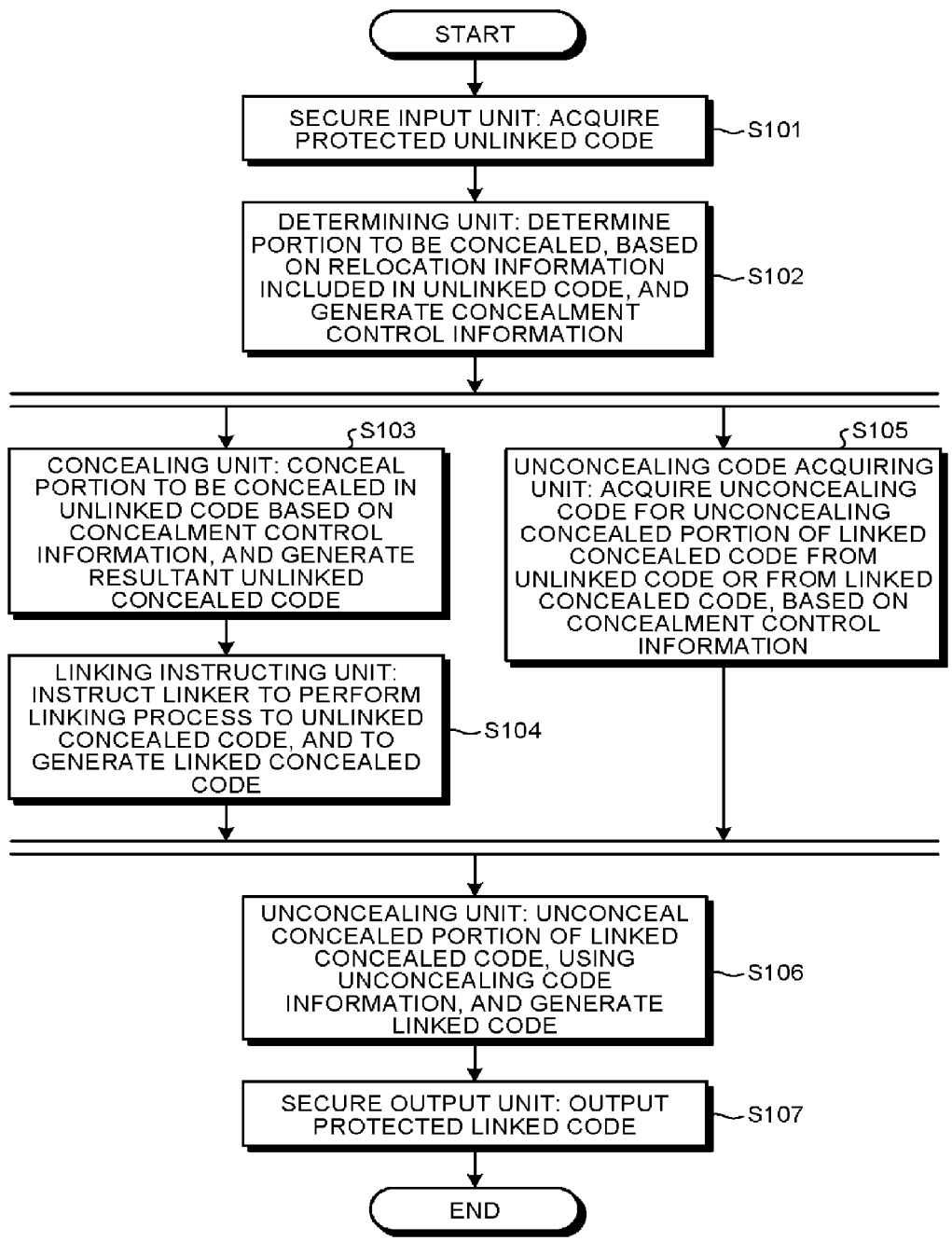
FIG. 14 is a flowchart illustrating a process performed by the code processing apparatus.

A process performed by the code processing apparatus 100 according to the first embodiment will now be explained. FIG. 14 is a flowchart illustrating a process performed by the code processing apparatus 100 illustrated in FIG. 3.

To begin with, the secure input unit 110 receives an input of the protected unlinked code 210, and acquires the unlinked code 220 by removing the protection of the protected unlinked code 210 (Step S101).

The determining unit 120 determines the portion to be concealed in the unlinked code body 221 included in the unlinked code 220, based on the relocation information 222 included in the unlinked code 220 acquired at Step S101, and generates concealment control information 230 specifying the determined portion to be concealed (Step S102). At this time, the determining unit 120 determines the portion to be concealed in the unlinked code body 221 excluding the portion to be relocated specified in the relocation information 222 so that the linker 920 can perform the linking process even after the portion to be concealed is concealed.

The concealing unit 130 then generates the unlinked concealed code 250 by concealing the portion to be concealed in the unlinked code body 221 based on the concealment control information 230 generated at Step S102 (Step S103).

The linking instructing unit 140 then instructs the linker 920 to perform the linking process to the unlinked concealed code 250 generated at Step S103, thereby causing the linker 920 to generate the linked concealed code 260 (Step S104).

After the determining unit 120 generates the concealment control information 230 at Step S102, the unconcealing code acquiring unit 170 acquires an unconcealing code for unconcealing the concealed portion of the linked concealed code 260 from the unlinked code 220 acquired at Step S101 or from the linked concealed code 260 generated by the linker 920 at Step S104, based on the concealment control information 230 generated at Step S102. The unconcealing code acquiring unit 170 then generates the unconcealing code information 240 specifying the acquired unconcealing code and the position of the portion to be unconcealed (Step S105). If the concealed portion of the unlinked code body 221 is concealed by replacement with a dummy code, the unconcealing code acquiring unit 170 acquires the original code corresponding to the concealed portion of the unlinked code body 221 from the unlinked code 220 as an unconcealing code. If the concealed portion of the unlinked code body 221 is concealed by encryption, the unconcealing code acquiring unit 170 acquires the unconcealing code by decrypting the concealed portion of the linked concealed code body 261 in the linked concealed code 260. The process at Step S105 may be performed in parallel with the process at Steps S103 and S104, or may be combined with the process at Steps S103 and S104.

The unconcealing unit 150 then unconceals the concealed portion (portion to be unconcealed) of the linked concealed code 260 generated by the linker 920 at Step S104, using the unconcealing code information 240 generated at Step S105, and generates the linked code 270 (Step S106).

Finally, the secure output unit 160 applies the protection to the linked code 270 generated at Step S106, and outputs the result as the protected linked code 280 (Step S107). A series of processes performed by the code processing apparatus 100 is then ended.

The process at each of the steps in the flowchart illustrated in FIG. 14 will now be explained in detail, with reference to some drawings as appropriate.

To begin with, the process performed by the secure input unit 110 at Step S101 will be explained. The secure input unit 110 receives an input of the protected unlinked code 210, and removes the protection of the protected unlinked code 210. The protected unlinked code 210 is generated by applying the protection to the unlinked code 220, and the protection removal is the process of removing this protection.

When the unlinked code 220 is protected by encryption, the protected unlinked code 210 is an encryption of the unlinked code 220, and the protection removal is a process of decrypting the encrypted unlinked code 220. In such a configuration, the secure input unit 110 reads the protected unlinked code 210 that is an encryption of the unlinked code 220, and acquires the unlinked code 220 by decrypting the protected unlinked code 210 using an encryption key retained internally to the code processing apparatus 100.

When the unlinked code 220 is protected by the access control enforced by an operating system (OS), the protected unlinked code 210 is an unlinked code 220 stored in a file located in a file system where accesses are controlled, so that the user of the code processing apparatus 100 is not permitted to gain a direct access to the file. By causing the code processing apparatus 100 to operate with a privilege to access the file, however, the secure input unit 110 can read the file using the privilege, remove the protection of the file, and acquire the unlinked code 220. Using a well-known technology, the code processing apparatus 100 can be caused to operate with a privilege that is not provided to any user. For example, a mechanism called set-user identification (SUID) can be used on Linux (registered trademark) to allow a user to execute a computer program using a privilege that is different from that of the user him/herself.

The unlinked code 220 acquired by the secure input unit 110 is retained in a format not easily accessed by the user of the code processing apparatus 100. For example, it is possible to prohibit the user of the code processing apparatus 100 from easily accessing the unlinked code 220 by retaining the unlinked code 220 in the working main memory, without retaining the unlinked code 220 in the file system as it is.

The process performed by the determining unit 120 at Step S102 will now be explained, with reference to the specific examples illustrated in FIGS. 4, 8, and 9. To begin with, the determining unit 120 determines a candidate of a portion to be concealed. In this example, the determining unit 120 determines only the code within the portion pointed by the symbol "symbol1" (from an address of 100 to an address of 150) as a candidate of a portion to be concealed. However, the determining unit 120 may determine the entire unlinked code body 221 as a candidate of a portion to be concealed, or use some information designating a candidate of a portion to be concealed (information provided by the person who has protected the code, e.g., the developer A who has developed the unlinked code 220) to determine the candidate.

The determining unit 120 then finds the portion to be concealed from the candidate portion to be concealed. In this example, the determining unit 120 determines the portion to be concealed by removing the portion to be relocated, which is to be applied with the relocation during the linking process, from the candidate portion to be concealed. The portion to be relocated can be identified using the relocation information 222 included in the unlinked code 220. In this example, it is assumed that the "relocation 1" specified as the relocation instruction 224 in the relocation information 222 is a relocation instruction for rewriting the range of 4 bytes from the position specified in the corresponding relocation position 223, and the relocation 2 is a relocation instruction for rewriting the range of 8 bytes from the position specified in the corresponding relocation position 223. In this example, the portion from the address 126 to the address 130, and the portion from the address 142 to the address 150 are identified as the portions to be relocated, because the address 126 and the address 142 are specified as the relocation positions 223 for the relocation instruction 1 and the relocation instruction 2, respectively. The determining unit 120 so determines the portion from the address 100 to the address 126, and the portion from the address 130 to the address 142 as the portions to be concealed, as a result of excluding the portions to be relocated from the candidate portion to be concealed that is the portion from the address 100 to the address 150.

The determining unit 120 then generates concealment control information 230 pointing to the determined portion to be concealed. In the exemplary concealment control information 230 illustrated in FIG. 8(a), the portion to be concealed is represented using a relative address with respect to the symbol "symbol1". In other words, the portions to be concealed are expressed as a range of the 0th byte to the 26th byte from the symbol "symbol1" and a range of the 30th byte to the 42nd byte from the symbol "symbol1", respectively. These expressions are, however, merely exemplary, and the portion to be concealed may be expressed as a range of 12 bytes from the 30th byte from the symbol "symbol1", as in the example in FIG. 8(b), or may be expressed using the addresses themselves. Furthermore, the exemplary concealment control information 230 illustrated in FIG. 8(b) includes an encryption key, in addition to the portion to be concealed. This concealment control information 230 represents that the portion to be concealed should be encrypted using the encryption key that is mapped to the portion to be concealed. For example, the example in FIG. 8(b) represents that a range of 26 bytes from the 0th byte offset of the "symbol1" should be encrypted using an encryption key "73294332".

In this example, the size of the portion to be relocated is specified using the relocation instruction 224 in the relocation information 222. However, it is also possible to use a fixed maximum size for the portions to be relocated, without using the relocation instruction 224, and to allow the determining unit 120 to determine a constant 8-byte portion from the position specified in the relocation position 223, as a portion to be relocated. In such a configuration, a larger portion needs to be excluded from the portion to be concealed, being larger than the actual portion to be relocated to which the relocation is applied by the linker 920. With such exclusion, however, it can be ensured that the portion to be relocated to which the relocation is applied by the linker 920 is surely excluded from the portion to be concealed so that the linking process is not obstructed.

Because the portion to be relocated is excluded from the portion to be concealed in the unlinked code body 221 during the process performed by the determining unit 120 at Step S102, the linker 920 can perform the linking process. Although only the portions to be relocated are excluded in the example explained above, the linker 920 may also refer to and use some other part of the code, being other than the portion to be relocated, in the linking process. The determining unit 120 may, therefore, perform a process of excluding such a code from the portion to be concealed, as required.

The process performed by the concealing unit 130 at Step S103 will now be explained with reference to the specific examples illustrated in FIGS. 8 and 9. The concealing unit 130 applies concealment to the unlinked code body 221, based on the concealment control information 230. In the concealment, the concealing unit 130 performs a process of concealing the portion to be concealed in the unlinked code body 221, using a predetermined method, or using a concealing method specified in the concealment control information 230.

For example, the concealing unit 130 identifies the portion to be concealed in the unlinked code body 221 based on the concealment control information 230 illustrated in FIG. 8(a). In other words, the concealing unit 130 identifies that the portion at an offset of "the 0th byte to the 26th byte" from the symbol "symbol1" and a portion at an offset of "the 30th byte to the 42nd byte" from the symbol "symbol1" are portions to be concealed. The concealing unit 130 then replaces the codes "code1" and "code3" that are portions to be concealed in the unlinked code body 221 illustrated in FIG. 9(a) with the concealing codes "concealed1" and "concealed3", respectively, to acquire the unlinked concealed code body 251 illustrated in FIG. 9(b). In this example, the concealing codes "concealed1" and "concealed3" are dummy codes. In this example, the concealment control information 230 does not include any information specifying the concealing method, and the concealing unit 130 applies the concealment using a predetermined method, which is replacement with a dummy code.

The concealing unit 130 may also perform the concealment in the manner described below, based on the concealment control information 230 illustrated in FIG. 8(b). In other words, the concealing unit 130 reads the codes "code1" and "code3" that are the portions to be concealed from the unlinked code body 221 illustrated in FIG. 9(a), and encrypts the codes "code1" and "code3" with the encryption keys "73294332" and "30318776", respectively, to acquire the concealing codes "concealed1" and "concealed3", respectively. The concealing unit 130 then replaces the codes "code1" and "code3" that are the portions to be concealed in the unlinked code body 221, with the concealing codes "concealed1" and "concealed3", respectively, to acquire the unlinked concealed code body 251 illustrated in FIG. 9(b). In this example, the concealing codes "concealed1" and "concealed3" are codes resulting from encrypting the respective original codes "code1" and "code3".

The process performed by the linking instructing unit 140 at Step S104 will now be explained. The linking instructing unit 140 instructs the external linker 920 in the code processing apparatus 100 to perform the linking process to the unlinked concealed code 250, and acquires the linked concealed code 260 from the linker 920 as a result of its process. When the linker 920 links the unlinked concealed code 250, the linker 920 may also link the unprotected unlinked code 930 illustrated in FIG. 1, as required. It is also possible to allow the linking instructing unit 140 to assist the linker 920 by taking a part of the linking process.

To apply the linking process to the unlinked concealed code 250 using the external linker 920 in the code processing apparatus 100, it is necessary to perform the process of exporting the unlinked concealed code 250 as a file, and calling the linker 920. The linked concealed code 260 can then be acquired by waiting for the linker 920 to complete the process, and by importing the resultant file output from the linker 920. Because the unlinked concealed code 250 is exported as a file, and the linked concealed code 260 is output from the linker 920 as a file, the developer B who is a user gains an access to the unlinked concealed code 250 and the linked concealed code 260. The developer B is, however, incapable of knowing the actual codes because the unlinked concealed code 250 and the linked concealed code 260 are concealed codes.

The code processing apparatus 100 according to the first embodiment does not require the linking instructing unit 140 or the external linker 920 to unconceal the unlinked concealed code body 251 included in the unlinked concealed code 250. If the portion to be relocated in the unlinked concealed code body 251 is concealed in such a manner that the portion to be relocated cannot be processed as it is, the portion to be relocated needs to be unconcealed before the linking process is performed, because the linking process requires rewriting of the portion to be relocated. With the code processing apparatus 100 according to the first embodiment, however, because the portion to be relocated in the unlinked concealed code body 251 and the relocation information 222 referred to by the linker 920 performing the linking process are both excluded from the portion to be concealed, the linking instructing unit 140 or the linker 920 does not need to unconceal the unlinked concealed code body 251 in order to allow the linking process to be performed.

The process performed by the unconcealing code acquiring unit 170 at Step S105 will now be explained with reference to the specific examples illustrated in FIGS. 8, 9, 10, and 13. The unconcealing code acquiring unit 170 performs a process of acquiring an unconcealing code for unconcealing the concealed portion concealed by the concealing unit 130 based on the concealment control information 230, and generating the unconcealing code information 240.

For example, the unconcealing code acquiring unit 170 identifies the portion to be concealed in the unlinked code body 221 included in the unlinked code 220, based on the concealment control information 230 illustrated in FIG. 8(a), and acquires the code of the portion to be concealed (original code) in the unlinked code body 221 as an unconcealing code. The process of identifying a portion to be concealed is the same process as that in which the concealing unit 130 identifies a portion to be concealed. In the exemplary unlinked code body 221 illustrated in FIG. 9(a), the code in the portion at an offset of "the 0th byte to the 26th byte" from the symbol "symbol1" is the code "code1", and the code in the portion at an offset of "the 30th byte to the 42nd byte" from the symbol "symbol1" is the "code3". The unconcealing code acquiring unit 170 therefore acquires the codes "code1" and "code3" in the unlinked code body 221 illustrated in FIG. 9(a) as unconcealing codes, and generates the unconcealing code information 240 by mapping the acquired unconcealing codes to the head positions of the respective portions to be unconcealed (maps the "code1" to the offset of "0 bytes" from the symbol "symbol1", and maps the "code3" to the offset of "30 bytes" from the symbol "symbol1").

The unconcealing code acquiring unit 170 may also generate the unconcealing code information 240 in the manner described below, based on the concealment control information 230 illustrated in FIG. 8(b). In other words, the unconcealing code acquiring unit 170 identifies the concealed portion from the linked concealed code body 261 included in the linked concealed code 260 based on the concealment control information 230 illustrated in FIG. 8(b), and acquires a code for the concealed portion of the linked concealed code body 261. In the exemplary linked concealed code body 261 illustrated in FIG. 13(a), the code with a "26-byte" size from the offset of "0 bytes" from the symbol "symbol1" is "concealed1", and the code with a "12-byte" size from the offset of "30 bytes" from the symbol "symbol1" is "concealed3". The unconcealing code acquiring unit 170 therefore acquires "concealed1" and "concealed3" from the linked concealed code body 261 illustrated in FIG. 13(a). Because the code "concealed1" is an encryption of the "code1" encrypted with the encryption key "73294332", and the code "concealed3" is an encryption of the "code3" encrypted with the encryption key "30318776", both of which are encrypted by the concealing unit 130, the unconcealing code acquiring unit 170 decrypts "concealed1" and "concealed3" using the respective encryption keys included in the concealment control information 230, and acquires the resultant codes "code1" and "code3" as the unconcealing codes. The unconcealing code acquiring unit 170 then generates the unconcealing code information 240 by mapping the unconcealing codes to the head positions of the respective portions to be unconcealed (mapping the code "code1" to the offset of "0 bytes" from the symbol "symbol1", and mapping the code "code3" to the offset of "30 bytes" from the symbol "symbol1").

The process performed by the unconcealing unit 150 at Step S106 will now be explained with reference to the specific examples illustrated in FIGS. 10 and 13. The unconcealing unit 150 performs the unconcealment by overwriting the concealed codes in the linked concealed code body 261 included in the linked concealed code 260 with the respective unconcealing codes, based on the unconcealing code information 240, and generating the linked code 270 thereby.

As an example of the unconcealment performed by the unconcealing unit 150, explained now is an unconcealment using the first row of the unconcealing code information 240 illustrated in FIG. 10 (the symbol "symbol1", the offset of "0 bytes", and the unconcealing code "code1"). To begin with, the unconcealing unit 150 identifies the head position of the portion to be unconcealed from the linked concealed code body 261, that is, the concealed portion of the linked concealed code body 261, based on the symbol "symbol1" and the offset of "0 bytes". In the exemplary linked concealed code body 261 illustrated in FIG. 13(*b*), because the symbol "symbol1" corresponds to the address 200, the head position of the portion to be unconcealed is at the address 200. To recognize the position of the symbol "symbol1" in the linked concealed code body 261 as the address 200, the unconcealing unit 150 may refer to the symbol information included in the linked concealed code 260 or a mapping relation between symbols and addresses retained in a map file output from the linker 920. A map file is information representing the address to which a code corresponding to a symbol is relocated after the linking process.

The unconcealing unit 150 then overwrites the code "concealed1" starting from the address 200 in the linked concealed code body 261 illustrated in FIG. 13(*b*) with the unconcealing code "code1". In the linked concealed code body 261 illustrated in FIG. 13(*b*), the unconcealing unit 150 overwrites the portion from the address 200 to the address 226 storing therein the concealed code "concealed1", with the unconcealing code "code1", so that the original code "code1" is unconcealed. The unconcealing unit 150 eventually acquires the linked code body 271 illustrated in FIG. 13(*b*), by performing the same process based on the second row of the unconcealing code information 240 illustrated in FIG. 10 (the symbol "symbol1", the offset of "30 bytes", and the unconcealing code "code3").

The linked code 270 resulting from the unconcealment performed by the unconcealing unit 150 is retained in a manner not easily accessed by the user of the code processing apparatus 100, in the same manner as the unlinked code 220. The linked code 270 including the linked code body 271 illustrated in FIG. 13(*b*) functions normally because the concealed codes "concealed1" and "concealed3" are unconcealed to the codes "code1" and "code3", respectively.

The linked code body 271 illustrated in FIG. 13(*b*) can be achieved by directly applying the linking process to the unlinked code body 221 illustrated in FIG. 9(*a*). If this linking process is to be performed with a general-purpose linker 920, however, the unlinked code 220 is inevitably disclosed to the developer B, because any developers are generally permitted to look at the codes processed by a general-purpose linker 920. Therefore, in order to allow the linking process to be performed without disclosing the unlinked code 220 to the developer B, some kind of measure, e.g., use of a special linker capable of accepting an encrypted code such as the protected unlinked code 210, is required. To allow the linking process to be performed with a special linker, however, an enormous number of hours are required in, for example, implementing the special linker independently from the general-purpose linker 920, or modifying the general-purpose linker 920. Furthermore, because the general-purpose linker 920 is not used as it is, development designed with use of the general-purpose linker 920 in mind is quite unacceptable. With the code processing apparatus 100 according to the first embodiment, however, because the linking process can be performed with the general-purpose linker 920, as described above, such a problem is no longer relevant.

Finally, the process performed by the secure output unit 160 at Step S107 will be explained. The secure output unit 160 applies the protection to the linked code 270, and outputs the protected code as the protected linked code 280. The protection applied to the linked code 270 by the secure output unit 160 is the same as the protection applied to the unlinked code 220 by the code protecting apparatus 810 in the computer 800, and may be a process of encrypting or a process of setting access control, for example.

Specific examples of the processes performed by the code processing apparatus 100 according to the first embodiment are explained above, but the processes explained above are merely conceptual, and various modifications are still possible. For example, a plurality of processes may be executed as one process. As another example, when the concealing unit 130 reads the unlinked code 220, the corresponding unconcealing code information 240 may be generated by the unconcealing code acquiring unit 170. It is also possible for the unconcealing unit 150 and the unconcealing code acquiring unit 170 to be integrated so that the integration can decrypt the linked concealed code 260 to acquire the unconcealing code information 240, and generate the linked code 270 by overwriting the decryption result with the unconcealing code.

As explained above in detail using some specific examples, with the first embodiment, the developer A can permit the developer B (the user of the code processing apparatus 100) to perform the linking process using a general-purpose linker 920 without disclosing the actual unlinked code 220 to the developer B, and without requiring any special processes such as a process of unconcealing the code during the linking process.

First Modification

It is also possible to encrypt the unconcealing code information 240, and to include the encryption in the unlinked concealed code 250. An exemplary way to include the unconcealing code information 240 in the unlinked concealed code 250 is compressing and encrypting the unconcealing code, and appending the compressed unconcealing code to a section other than the sections storing therein the unlinked concealed code body 251.

Second Modification

It is also possible to encrypt the unlinked code 220 and the unconcealing code information 240 so that the user of the code processing apparatus 100 is not permitted to know the code easily. The encrypted unlinked code 220 and the unconcealing code information 240 may then be stored, without protection, in a location where the user of the code processing apparatus 100 is permitted to access, e.g., a file system on a hard disk, for example.

Third Modification

In the first embodiment described above, the process of unconcealing the code is explained to be performed using the symbols mapping the positions of the codes "code1" and "code3" that are the portions to be concealed with the positions of the concealed codes "concealed1" and "concealed3" in the linked concealed code body 261 of the unlinked code body 221. The way for mapping the code positions, however, is not limited to the use of symbols. For example, the code positions may be mapped using special tags instead of the symbols.

Figure 16:
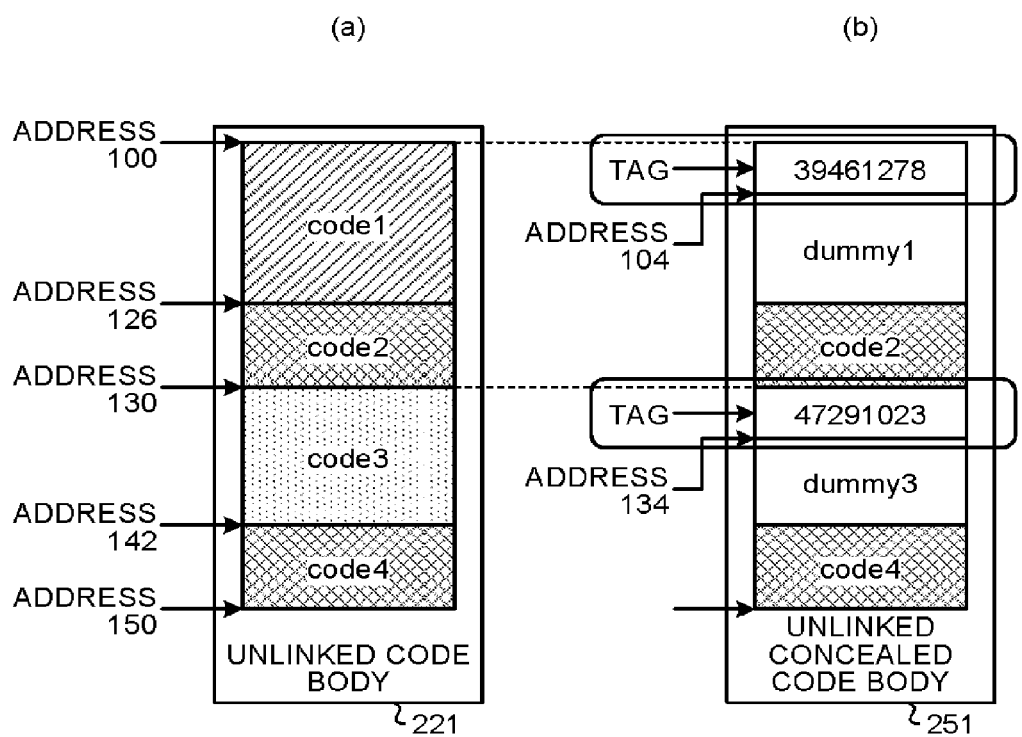
FIG. 16 is a schematic illustrating a specific example of the unlinked code body and the unlinked concealed code body.

FIG. 15 is a schematic illustrating a specific example of the concealment control information 230 when tags are used to map the code positions. FIG. 16 is a schematic illustrating specific examples of the unlinked code body 221 and the unlinked concealed code body 251 when the tags are used to map the code positions. FIG. 16(a) illustrates the unlinked code body 221, and FIG. 16(b) illustrates the unlinked concealed code body 251.

The tags are information used for identification, and are small pieces of information that can be retained as a part of the code. In the third modification, the determining unit 120 generates the concealment control information 230 illustrated in FIG. 15. The concealment control information 230 illustrated in FIG. 15 does not include any symbols, but instead retains the head address and the size of the portion to be concealed, and the tag assigned to the portion to be concealed, in a manner mapped to one another. The value used as a tag is selected by the determining unit 120 in such a manner that use of values matching the values of the other tags or the values in the code is avoided as much as possible, e.g., by generating random numbers.

The concealing unit 130 then performs a process of replacing the code in the portion to be concealed included in the unlinked code body 221, with a tag and the dummy code, based on the concealment control information 230. In the example illustrated in FIG. 16, the concealing unit 130 generates the unlinked concealed code body 251 by replacing the code "code1", which is a portion to be concealed in the unlinked code body 221, with a tag "39461278" and a dummy code "dummy1", and replacing the "code3", which is another portion to be concealed in the unlinked code body 221, with a tag "47291023" and a dummy code "dummy3". In this example, the tag size is 4 bytes, and the portion from the address 100 to the address 104 is replaced with the tag "39461278", and the portion from the address 104 to the address 126 is replaced with the dummy code "dummy1". The portion from the address 130 to the address 134 is replaced with the tag "47291023", and the portion from the address 134 to the address 142 is replaced with the dummy code "dummy3".

Although the linker 920 may rewrite the codes "code2" and the "code4" in the unlinked concealed code body 251 during the relocation, the linker 920 does not rewrite the portion corresponding to the tags and the dummy codes. Therefore, the tags remain untouched in the linked concealed code body 261. The unconcealing unit 150 then refers to the tag (for example, "39461278") in the concealment control information 230, and retrieves for the code position matching the tag from the linked concealed code body 261. The unconcealing unit 150 can then unconceal the concealed portion of the linked concealed code body 261 by overwriting the concealed portion from that position, with the unconcealing code.

Fourth Modification

In the first embodiment described above, the portion to be relocated included in the unlinked code body 221 is excluded from concealment. There are, however, some cases in which the linker 920 can process the code of a portion to be relocated, even with the concealment applied, without unconcealing the portion, provided that a particular method is used to conceal the portion to be relocated. In such a case, a portion to be relocated may be included in a portion to be concealed.

Figure 17:
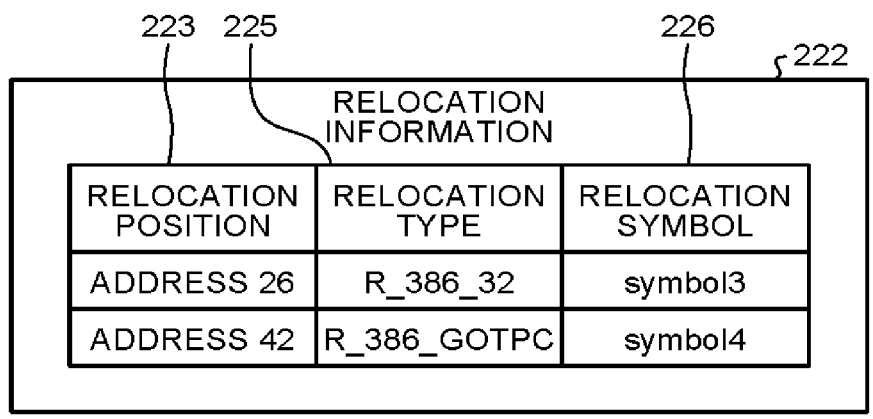
FIG. 17 is a schematic illustrating a specific example of relocation information.

To begin with, the relocation performed by the linker 920 will be explained briefly. FIG. 17 is a schematic illustrating a specific example of the relocation information 222 in the ELF object format for x86 processors. In the example illustrated in FIG. 17, the relocation information 222 is information that maps a relocation position 223, a relocation type 225, and a relocation symbol 226. The relocation type 225 is a type designating a type of calculation used by the linker 920 when the linker 920 performs the relocation. The relocation symbol 226 is a symbol used in the relocation calculation. The linker 920 performs the relocation by performing a calculation based on the calculation scheme specified in the relocation type 225, using the value specified in the relocation position 223 and the address specified in the relocation symbol 226, and by rewriting the original value found at the relocation position 223 with the calculation result. For example, when a calculation is of a relocation type 225 of "R_386_32", the linker 920 adds the address of the relocation symbol 226 to the value found at the relocation position 223. When it is known that the linker 920 performs only an addition or a subtraction to a portion to be relocated, as described in the example above, addition-subtraction concealment may be used to conceal a portion to be relocated. The addition-subtraction concealment is an approach of concealing a portion by adding some value, and unconcealing the portion by subtracting the same value. Explained now is an operation performed when the addition-subtraction concealment is used to conceal and to unconceal a portion to be relocated.

Assuming that, in the linking process, the linker adds the address S of a symbol to a value A unapplied with the relocation, the value resulting from the linking process (after the relocation) is A+S. The value A unapplied with the relocation may be concealed by adding a value R to A, as A+R, so that the value after the linking process (after the relocation) will be (A+R)+S. By subtracting R from this value, as (A+R)+S−R=A+S, the intended value A+S after the relocation can be achieved.

FIG. 18 is a schematic for explaining a specific example of the calculation performed with the addition-subtraction concealment. In this concealment, the concealing unit 130 adds a value for concealment "49418638" to the value "100" specified at the portion to be relocated in the unlinked code body 221, and the resultant value "49418738" is acquired for the concealed portion to be relocated. In the linking process, the linker 920 then adds a value "40000" to the value "49418738" in the concealed portion to be relocated, and the resultant concealed relocated value "49458738" is acquired. In the unconcealment, the unconcealing unit 150 subtracts the value for concealment "49418638" from the concealed and relocated value "49458738", and the unconcealed relocated value "40100" is acquired. This result is the same as the value resulting from adding the value "40000" to the original value "100" at the portion to be relocated in the linking process.

To allow the concealing unit 130 and the unconcealing unit 150 to conceal and to unconceal a portion to be concealed with the addition-subtraction concealment, required is a piece of information mapping a portion to be concealed determined by the determining unit 120 to a concealing method and a concealing key (an encryption key, if encryption is used as the concealing method, and a value used for concealment if the addition-subtraction concealment is used as the concealing method) used for the portion to be concealed. Such information may be included in the concealment control information 230 generated by the determining unit 120, for example. FIG. 19 is a schematic illustrating a specific example of the concealment control information 230 including the information mapping a portion to be concealed to a concealing method and a concealing key. The exemplary concealment control information 230 illustrated in FIG. 19 specifies that the portion to be concealed at an offset of "26 bytes" from the symbol "symbol1" and having a size of "4 bytes" is concealed with the addition-subtraction concealment using a value "49418638".

The determining unit 120 determines whether the linker 920 can perform its process normally even with the addition-subtraction concealment, to determine whether a portion to be relocated is to be concealed with the addition-subtraction concealment, by referring to the relocation type 225 in the relocation information 222 illustrated in FIG. 17. Specifically, the determining unit 120 may determine the concealing method used for a relocation type by referring to a concealing method table 290, an example of which is illustrated in FIG. 20. The determining unit 120 may, for example, refer to the concealing method table 290 illustrated in FIG. 20, and determine that the addition-subtraction concealment should be used for a portion to be relocated with the relocation type "R_386_32". The determining unit 120 may then generate the concealment control information 230 specifying that the addition-subtraction concealment is to be performed with a value "49418638" to the portion to be concealed at an offset of "26 bytes" from the symbol "symbol1" and having a size of "4 bytes", as illustrated in the example in FIG. 19.

In the manner described above, even to the unlinked concealed code 250 resulting from concealing a portion to be concealed including a portion to be relocated, the linker 920 can perform the linking process appropriately, as long as the unlinked concealed code 250 is concealed in a manner not obstructing the process of the linker 920.

Second Embodiment

A second embodiment of the present invention will now be explained. In the first embodiment described above, the same code processing apparatus 100 in the computer 900 belonging to the developer B takes entire responsibilities for generating the unlinked concealed code 250 processable by the linker 920, the linking process performed by the linker 920, and unconcealing of the linked concealed code 260 resultant of the linking process. In the second embodiment, however, the unlinked concealed code 250 is generated on the computer 800 belonging to the developer A, and the linking process and the unconcealment of the linked concealed code 260 are performed on the computer 900 belonging to the developer B. In the explanation hereunder, elements that are the same as those in the first embodiment are given the same reference numerals, and explanations thereof are omitted as appropriate.

Figure 21:
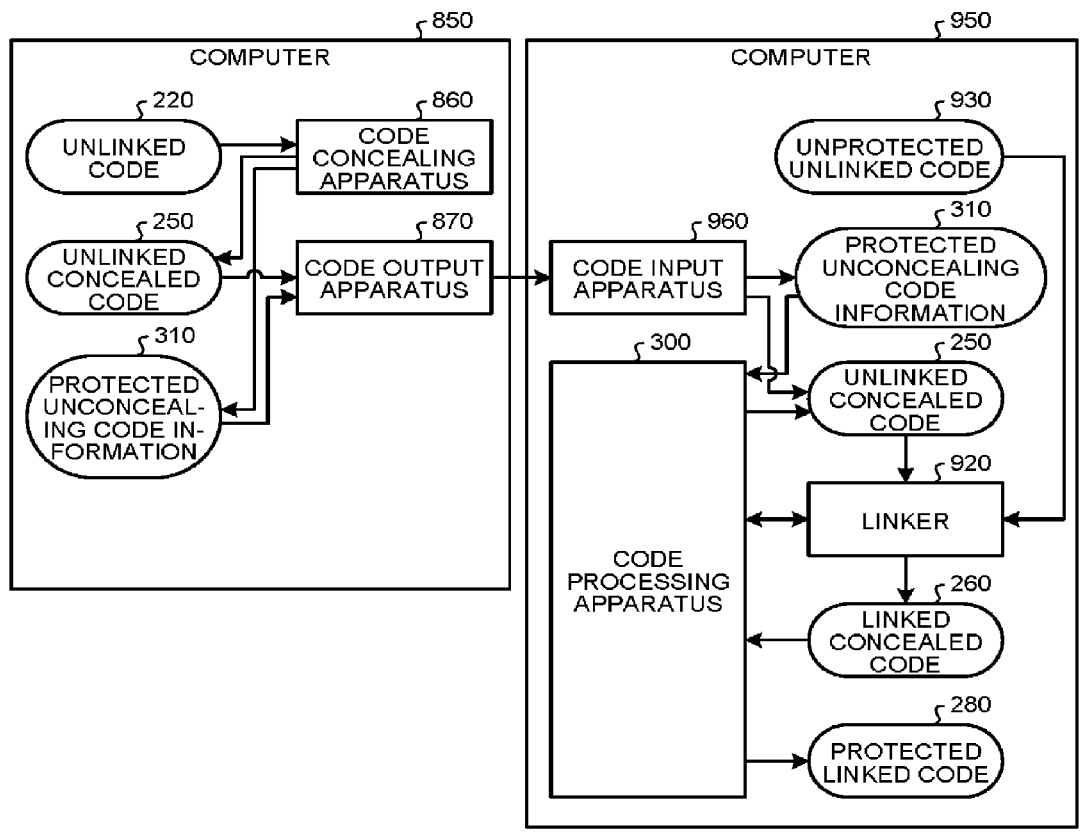
FIG. 21 is a block diagram illustrating an exemplary configuration of a computer program development system according to a second embodiment of the present invention.

FIG. 21 is a block diagram illustrating an exemplary configuration of a computer program development system according to the second embodiment. The computer program development system according to the second embodiment includes the computer 850 used by the developer A and the computer 950 used by the developer B, as illustrated in FIG. 21. The developer A and the developer B are developers that cooperate together to develop a computer program. The developer A develops a program code using the computer 850. The developer B develops an executable program code based on the program code developed by the developer A, using the computer 950.

The computer 850 used by the developer A includes a code concealing apparatus 860 and a code output apparatus 870.

The code concealing apparatus 860 applies the concealment to the unlinked code 220, and generates the unlinked concealed code 250 and the protected unconcealing code information 310. The code concealing apparatus 860 will be described later in detail.

The code output apparatus 870 outputs the unlinked concealed code 250 and the protected unconcealing code information 310 generated by the code concealing apparatus 860. Outputting herein means a process of taking out the unlinked concealed code 250 and the protected unconcealing code information 310 from the computer 850 so as to make the code and the information available to the computer 950, in the same manner as in the first embodiment.

The computer 950 used by the developer B includes a code input apparatus 960, the linker 920, and a code processing apparatus 300 according to the second embodiment.

The code input apparatus 960 receives an input of the unlinked concealed code 250 and the protected unconcealing code information 310 output from the code output apparatus 870. Receiving an input herein is a process of making the unlinked concealed code 250 and the protected unconcealing code information 310 output from the code output apparatus 870 available to the computer 950, in the same manner as in the first embodiment.

The code processing apparatus 300 generates the protected linked code 280 from the unlinked concealed code 250 and the protected unconcealing code information 310 received via the code input apparatus 960, by cooperating with the external linker 920. The code processing apparatus 300 will be described later in detail.

The protected unconcealing code information 310 is information resulting from applying the protection to the unconcealing code information 240 explained in the first embodiment. The protected unconcealing code information 310 may be a group of a plurality of pieces of protected information, rather than one piece of information.

Figure 22:
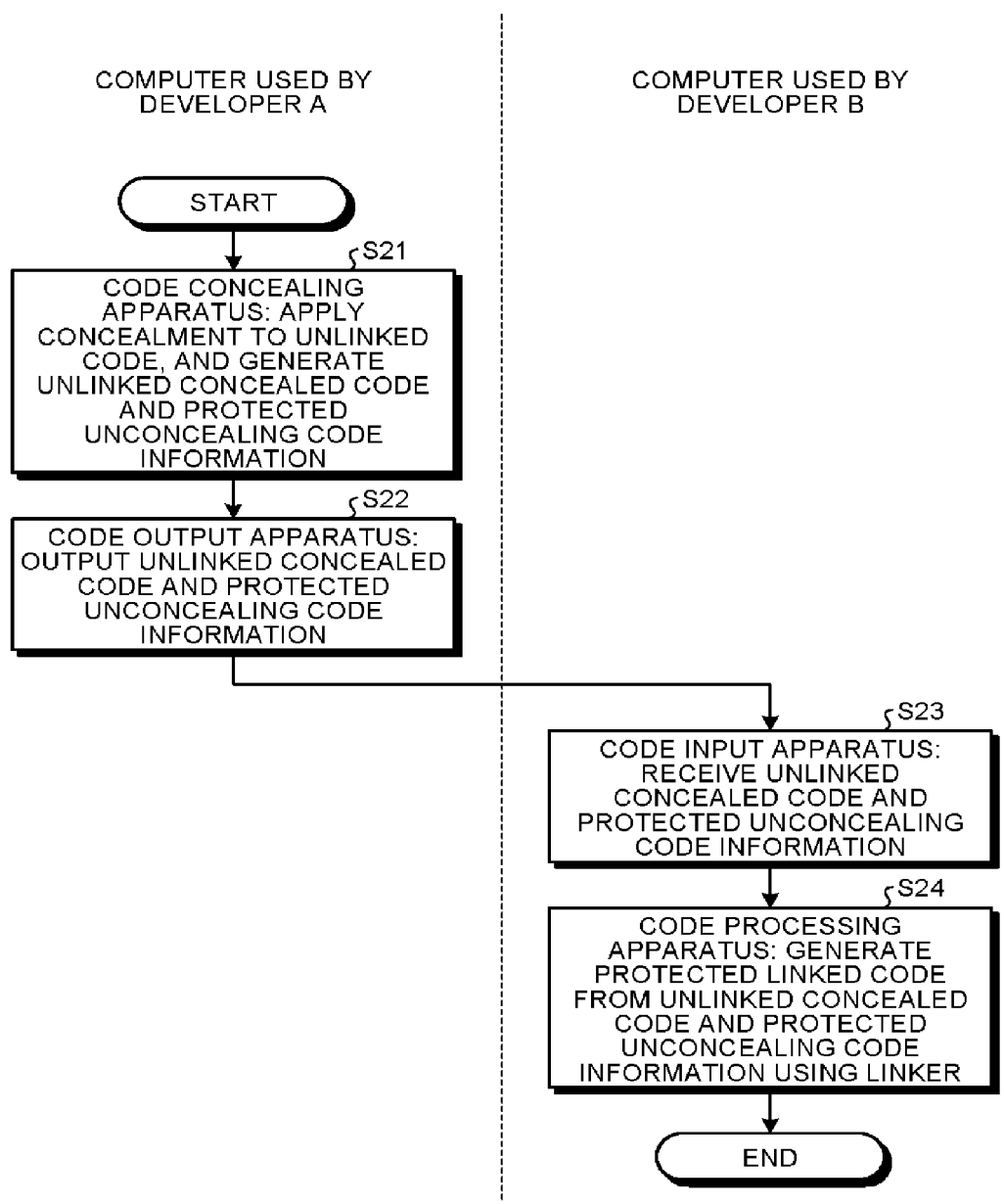
FIG. 22 is a flowchart illustrating a process performed by the computer program development system.

The process performed by the computer program development system according to the second embodiment will now be explained. FIG. 22 is a flowchart illustrating a process performed by the computer program development system illustrated in FIG. 21. The computer 850 belonging to the developer A performs the process at Step S21 and Step S22, in response to an operation performed by the developer A. The computer 950 belonging to the developer B then performs the process at Step S23 and Step S24, in response to an operation performed by the developer B.

At Step S21, the code concealing apparatus 860 in the computer 850 applies the concealment to the unlinked code 220, and generates the unlinked concealed code 250 and the protected unconcealing code information 310. The unlinked concealed code 250 is in a format allowing the linker 920 in the computer 950 to perform the linking process.

At Step S22, the code output apparatus 870 in the computer 850 outputs the unlinked concealed code 250 and the protected unconcealing code information 310 to make the code and the information available to the computer 950.

At Step S23, the code input apparatus 960 in the computer 950 receives an input of the unlinked concealed code 250 and the protected unconcealing code information 310 output from the computer 850.

At Step S24, the code processing apparatus 300 in the computer 950 generates the protected linked code 280 from the unlinked concealed code 250 and the protected unconcealing code information 310, using the linker 920. Specifically, the code processing apparatus 300 generates the unconcealing code information 240 by removing the protection of the protected unconcealing code information 310 received via the code input apparatus 960. The code processing apparatus 300 also designates the unlinked concealed code 250 received via the code input apparatus 960, and instruct the linker 920 to process the unlinked concealed code 250. The linker 920 generates the linked concealed code 260 by performing the linking process to the unlinked concealed code 250 and to the unprotected unlinked code 930 developed by the developer B. The linking process applied to the unprotected unlinked code 930 is however not a requirement. The code processing apparatus 300 unconceals the linked concealed code 260 using the unconcealing code information 240, applies the protection to the linked concealed code 260, and outputs the protected linked code 280.

Figure 23:
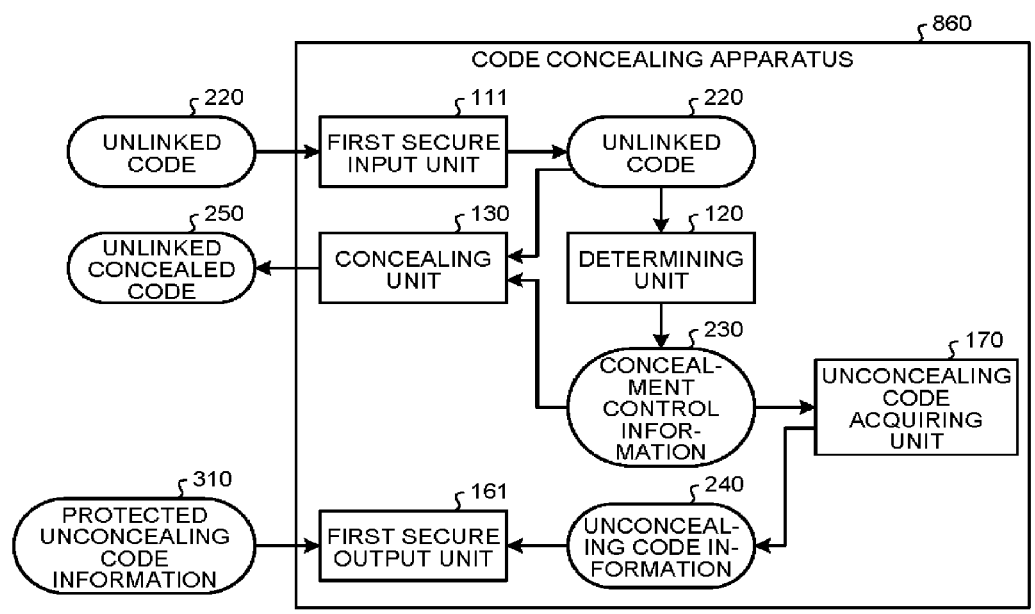
FIG. 23 is a block diagram illustrating an exemplary configuration of a code concealing apparatus.

The code concealing apparatus 860 will now be explained in detail. FIG. 23 is a block diagram illustrating an exemplary configuration of the code concealing apparatus 860. The code concealing apparatus 860 includes a first secure input unit 111, the determining unit 120, the concealing unit 130, a first secure output unit 161, and the unconcealing code acquiring unit 170, as illustrated in FIG. 23.

The first secure input unit 111 receives an input of the unlinked code 220. The first secure input unit 111 may be configured to receive the protected unlinked code 220, and to remove the protection to acquire the unlinked code 220, in the same manner as in the secure input unit 110 provided to the code processing apparatus 100 according to the first embodiment.

The determining unit 120, the concealing unit 130, and the unconcealing code acquiring unit 170 are the same as those included in the code processing apparatus 100 according to the first embodiment.

The first secure output unit 161 generates the protected unconcealing code information 310 by applying the protection to the unconcealing code information 240 generated by the unconcealing code acquiring unit 170, and outputs the protected unconcealing code information 310.

A process performed by code concealing apparatus 860 will now be generally explained. To begin with, the first secure input unit 111 receives an input of the unlinked code 220. The determining unit 120 then determines the portion to be concealed in the unlinked code body 221 based on the relocation information 222 included in the unlinked code 220, and generates the concealment control information 230. The concealing unit 130 then generates the unlinked concealed code 250 by concealing the portion to be concealed in the unlinked code body 221 based on the concealment control information 230. The unconcealing code acquiring unit 170 then acquires the corresponding unconcealing code based on the concealment control information, and generates the unconcealing code information 240. Finally, the first secure output unit 161 applies the protection to the unconcealing code information 240, and outputs the protected unconcealing code information 310.

Figure 24:
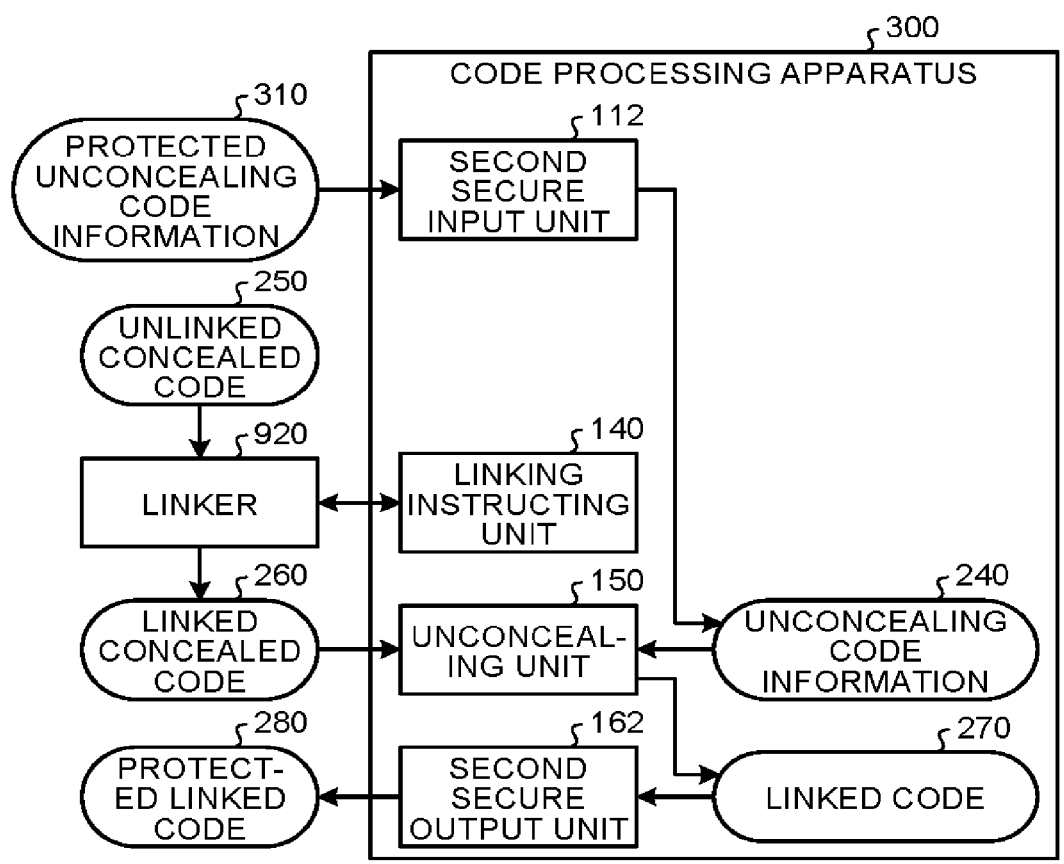
FIG. 24 is a block diagram illustrating an exemplary configuration of the code processing apparatus according to the second embodiment.

The code processing apparatus 300 according to the second embodiment will now be explained in detail. FIG. 24 is a block diagram illustrating an exemplary configuration of the code processing apparatus 300 according to the second embodiment. The code processing apparatus 300 according to the second embodiment includes a second secure input unit 112, the linking instructing unit 140, the unconcealing unit 150, and a second secure output unit 162, as illustrated in FIG. 24.

The second secure input unit 112 receives an input of the protected unconcealing code information 310, and removes the protection of the protected unconcealing code information 310, and acquires the unconcealing code information 240.

The linking instructing unit 140 and the unconcealing unit 150 are the same as those included in the code processing apparatus 100 according to the first embodiment.

The second secure output unit 162 applies the protection to the linked code 270, and outputs the protected linked code 280, in the same manner as in the secure output unit 160 provided to the code processing apparatus 100 according to the first embodiment.

A process performed by the code processing apparatus 300 according to the second embodiment will now be generally explained. To begin with, the second secure input unit 112 receives an input of the protected unconcealing code information 310, removes the protection, and acquires the unconcealing code information 240. The linking instructing unit 140 instructs the external linker 920 to perform the linking process to the unlinked concealed code 250, and to generate the linked concealed code 260. The unconcealing unit 150 then unconceals the concealed portion of the linked concealed code 260 using the unconcealing code information 240, and generates the linked code 270. Finally, the second secure output unit 162 applies the protection to the linked code 270, and outputs the protected linked code 280.

As explained above, in the second embodiment, the computer 950 used by the developer B receives an input of the unlinked concealed code 250 and the protected unconcealing code information 310, and the developer B is not permitted to know the unlinked code 220. Furthermore, the developer B can perform the linking process to the unlinked concealed code 250 provided by the developer A, using the code processing apparatus 300 and the linker 920. According to the second embodiment, therefore, the developer A can permit the developer B to perform the linking process using a general-purpose linker 920 without disclosing the unlinked code 220 to the developer B (the user of the code processing apparatus 300) and without requiring any special process such as a process of unconcealing the code during the linking process, in the same manner as in the first embodiment.

Third Embodiment

A third embodiment of the present invention will now be explained. In the first embodiment described above, the code processing apparatus 100 receives an input of the protected unlinked code 220 (protected unlinked code 210), and outputs the protected linked code 270 (protected linked code 280). By contrast, in the third embodiment, the code processing apparatus is enabled to input and to output codes in a fat binary format. The general configuration of the computer program development system according to the third embodiment is the same as that according to the first embodiment illustrated in FIG. 1, except that, in the computer program development system according to the third embodiment, the computer 900 used by the developer B includes a code processing apparatus 600 according to the third embodiment (see FIG. 25), instead of the code processing apparatus 100 according to the first embodiment. In the explanation hereunder, elements that are the same as those in the first embodiment are given the same reference numerals, and explanations thereof are omitted as appropriate.

Figure 25:
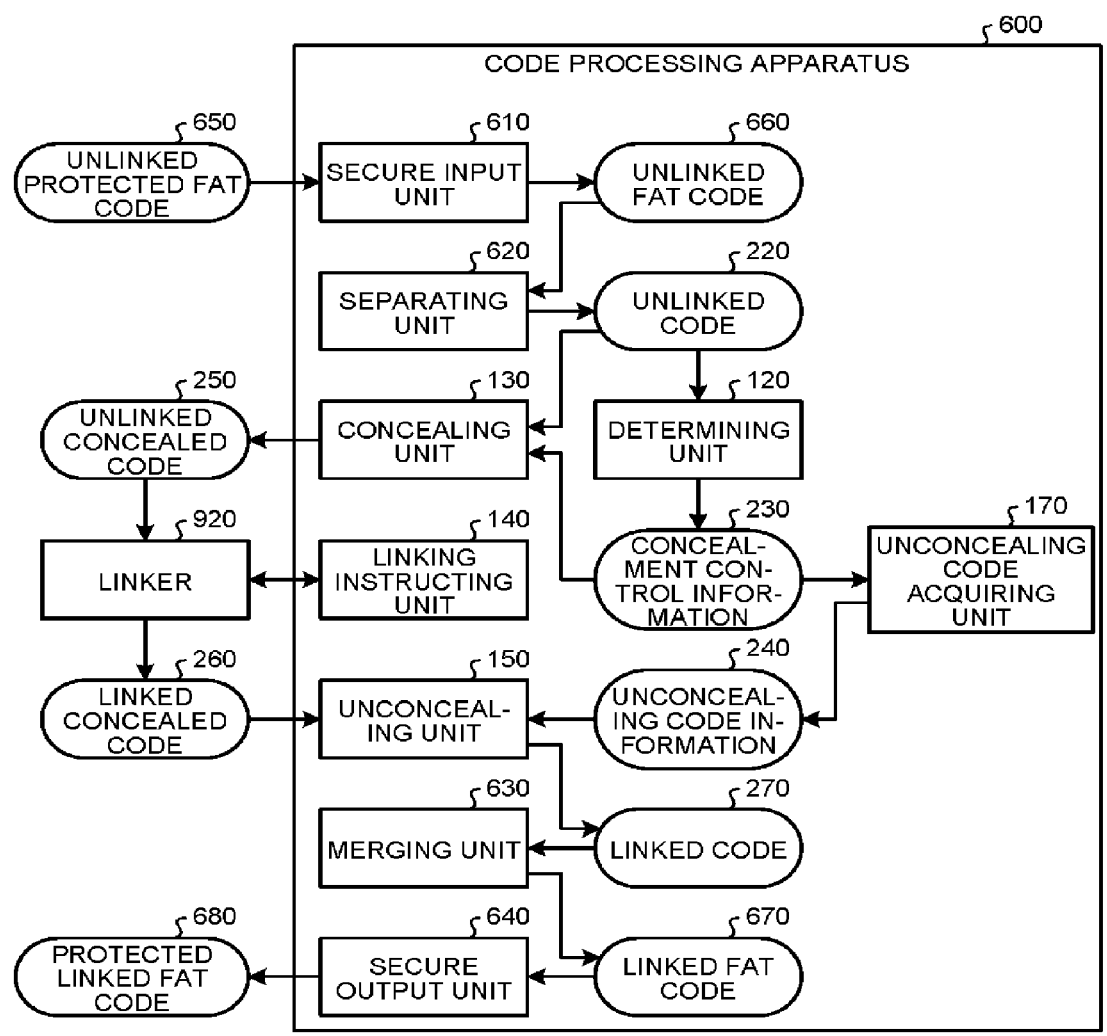
FIG. 25 is a block diagram illustrating an exemplary configuration of a code processing apparatus according to a third embodiment of the present invention.

FIG. 25 is a block diagram illustrating an exemplary configuration of the code processing apparatus 600 according to the third embodiment. The code processing apparatus 600 according to the third embodiment includes a secure input unit 610, a separating unit 620, the determining unit 120, the concealing unit 130, the linking instructing unit 140, the unconcealing code acquiring unit 170, the unconcealing unit 150, a merging unit 630, and a secure output unit 640, as illustrated in FIG. 25.

The secure input unit 610 receives an input of an unlinked protected fat code 650 that is the result of applying protection to the unlinked fat code 660, removes the protection, and acquires the unlinked fat code 660.

The separating unit 620 separates the unlinked fat code 660 into a plurality of the unlinked codes 220.

The determining unit 120, the concealing unit 130, the linking instructing unit 140, the unconcealing code acquiring unit 170, and the unconcealing unit 150 are the same as those included in the code processing apparatus 100 according to the first embodiment. The determining unit 120 according to the third embodiment, however, determines a portion to be concealed in the unlinked code body 221 for each of the unlinked codes 220 separated by the separating unit 620, and generates the concealment control information 235 indicating the portions to be concealed in the respective unlinked code bodies 221. The concealing unit 130, the linking instructing unit 140, the unconcealing code acquiring unit 170, and the unconcealing unit 150 according to the third embodiment perform their respective processes explained in the first embodiment to each of the unlinked codes 220 separated by the separating unit 620.

The merging unit 630 merges the linked codes 270 that are resultant of the unconcealment by the unconcealing unit 150 into a linked fat code 670.

The secure output unit 640 generates the protected linked fat code 680 by applying the protection to the linked fat code 670. The secure output unit 640 then outputs the protected linked fat code 680.

Figure 26:
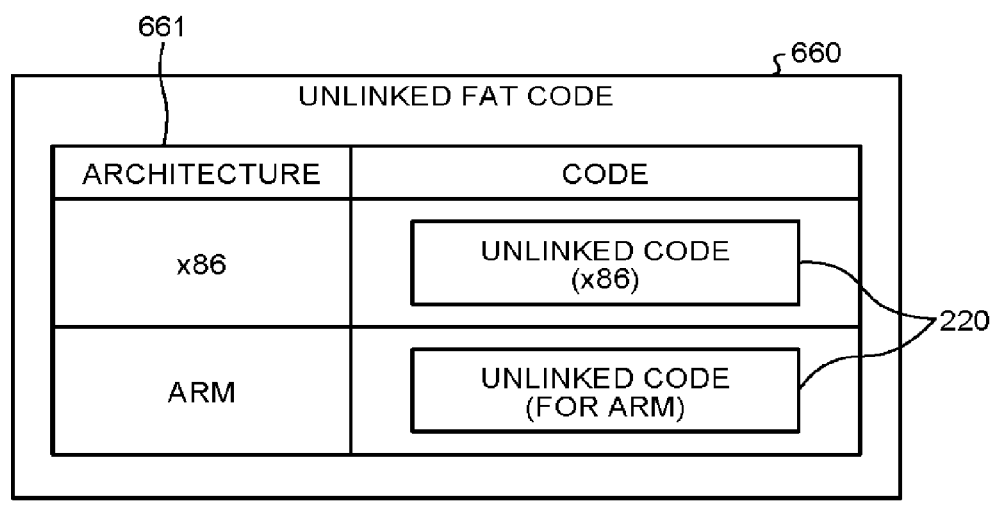
FIG. 26 is a schematic illustrating a specific example of an unlinked fat code.

The unlinked fat code 660 is a code storing therein the unlinked codes 220 in a fat binary format. The fat binary format is a format for storing therein a group of codes for a plurality of different respective computer architectures, and a known example of the fat binary format includes Universal Binary for Mac OS X (a registered trademark of Apple Inc.). FIG. 26 is a schematic illustrating a specific example of the unlinked fat code 660. The unlinked fat code 660 illustrated in FIG. 26 retains a plurality of unlinked codes 220 for the respective computer architectures, in a manner mapped to the respective architectures 661.

Figure 27:
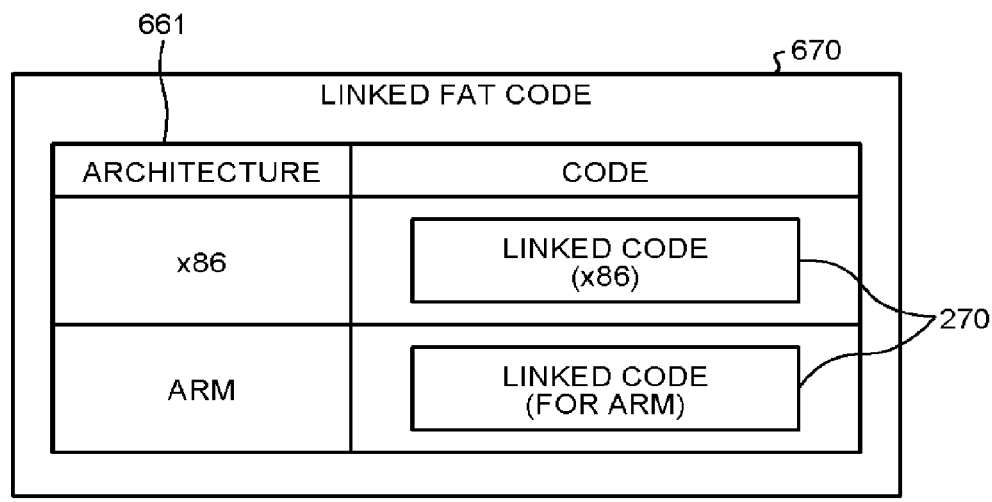
FIG. 27 is a schematic illustrating a specific example of a linked fat code.

The linked fat code 670 is a code storing therein the linked codes 270 in the fat binary format. FIG. 27 is a schematic illustrating a specific example of the linked fat code 670. The linked fat code 670 illustrated in FIG. 27 retains a plurality of linked codes 270 for the respective computer architectures, in a manner mapped to the respective architectures 661.

The unlinked protected fat code 650 is a code generated by applying the protection to the unlinked fat code 660. The protected linked fat code 680 is the result of the protection applied to the linked fat code 670.

The concealment control information 235 is information indicating a portion to be concealed determined by the determining unit 120 for each of the unlinked codes 220 separated by the separating unit 620, in a manner mapped to the architecture 661 corresponding to the unlinked code 220. FIG. 28 is a schematic illustrating a specific example of the concealment control information 235. The concealment control information 235 illustrated in FIG. 28 indicates that, in the unlinked code body 221 of the unlinked code 220 for the architecture "x86", the portion at an offset of "the 0th byte to the 26th byte" and the portion at an offset of "the 30th byte to the 42nd byte" from the position of the symbol "symbol1" are the portions to be concealed, and in the unlinked code body 221 of the unlinked code 220 for the architecture "ARM", the portion at an offset of "the 0th byte to the 20th byte" and the portion at an offset of "the 28th byte to the 40th byte" from the position of the symbol "symbol1" are the portions to be concealed. The portions to be concealed in the unlinked codes 220 may be the same or different among the architectures.

A process performed by the code processing apparatus 600 according to the third embodiment will now be explained. FIG. 29 is a flowchart illustrating a process performed by the code processing apparatus 600 illustrated in FIG. 25.

To begin with, the secure input unit 610 receives an input of the unlinked protected fat code 650, and acquires the unlinked fat code 660 by removing the protection of the unlinked protected fat code 650 (Step S301).

The separating unit 620 then separates the unlinked fat code 660 acquired at Step S301 into a plurality of the unlinked codes 220 corresponding to the respective architectures. The separation herein is a process of separating the merged codes into a plurality of independent processable codes. This separation can be achieved by analyzing the structure of the unlinked fat code 660, an example of which is illustrated in FIG. 26, and taking out the unlinked codes 220 corresponding to the respective architectures. A known example of the tool for performing this separation includes a lipo command that is a development tool for Mac OS X (registered trademark). A tool external to the code processing apparatus 600, however, cannot be used to perform the separation of the unlinked fat code 660 and the unlinked code 220, because the unlinked fat code 660 and the unlinked code 220 should not be disclosed to the user of the code processing apparatus 600 (developer B). Furthermore, this separation does not always require clear separation of the codes as pieces of information. For example, a process of identifying the head position and the end position of a code in the fat code so that the code within that portion can be handled independently in the subsequent process is considered as the separation.

The determining unit 120, the concealing unit 130, the linking instructing unit 140, the unconcealing code acquiring unit 170, and the unconcealing unit 150 then perform the processes at Steps S303 to S307 repeatedly for the unlinked codes 220 separated at Step S302 corresponding to the respective architectures. Because Steps S303 to S307 are the same as Steps S102 to S106 in FIG. 14 explained in the first embodiment, the explanations thereof are omitted herein.

Step S303 is, however, different from Step S102 according to the first embodiment in that the information of the architecture corresponding to the code currently being processed by the determining unit 120 is included in the concealment control information 235 so as to prevent the codes of the other architectures from being processed erroneously.

The merging unit 630 then merges the linked codes 270 generated for respective architectures by repeating the processes described above, and generates a linked fat code 670 (Step S308). This merging can be implemented by preparing a data structure of the linked fat code 670, an example of which is illustrated in FIG. 27, and inserting the linked codes 270 corresponding to the respective architectures into the data structure. An exemplary tool for performing this merge is the lipo command that is a development tool for Mac OS X (registered trademark), which is the same tool as that used in separating the codes.

Finally, the secure output unit 640 applies the protection to the linked fat code 670 generated at Step S308, and outputs the result as the protected linked fat code 680 (Step S309). A series of processes performed by the code processing apparatus 600 is then ended.

As explained above, with the code processing apparatus 600 according to the third embodiment, because the code processing apparatus separates and merges the codes internally, the code processing apparatus can input and output a fat binary code while keeping the codes concealed.

First Modification

In the third embodiment described above, the linker 920 processes the unlinked concealed code 250 that is in a format not the fat binary format, but the linker 920 may also be enabled to process the fat binary codes. To achieve such a configuration, the merging unit 630 merges a plurality of unlinked concealed codes 250 corresponding to respective architectures into an unlinked concealed fat code, and outputs the unlinked concealed fat code. The linker 920 then generates the linked concealed fat code by processing the unlinked concealed fat code in response to an instruction of the linking instructing unit 140. The unconcealing unit 150 generates the linked fat code 670 by unconcealing the unlinked concealed fat code.

Second Modification

In the third embodiment described above, the code processing apparatus 600 receives an input of the unlinked protected fat code 650, and outputs the protected linked fat code 680, but one of the input and the output may be a code that is not in the fat binary format. In other words, the code processing apparatus 600 may receive an input of the protected unlinked code 210 that is not in the fat binary format and output the protected linked fat code 680, or may receive an input of the unlinked protected fat code 650 and output the protected linked code 280.

Third Modification

Explained in the third embodiment is an example of the process performed to a fat binary code that is a group of codes corresponding to a plurality of respective architectures. As a mechanism similar to the fat binary code, widely practiced is merging the codes stored in a plurality of files into one file as a library code before providing the codes. The code processing apparatus 600 according to the third embodiment may therefore be modified in a manner enabled to input and to output such a library code.

Specifically, the secure input unit 610 reads a protected library code, and the separating unit 620 takes out the codes from the library code before performing the subsequent process. A library code retains information of file names, instead of the architectures 661 included in the unlinked fat code 660 illustrated in FIG. 26, or the linked fat code 670 illustrated in FIG. 27, and the codes are identified by the respective file names.

In such a configuration, because the linker 920 usually accepts an input of a library code directly, the merging unit 630 may generate an unlinked concealed library code by merging the unlinked concealed codes 250, and allows the linker 920 to process the unlinked concealed library code.

The code processing apparatus 100 according to the first embodiment may be provided as a computer program executed by the computer 900 used by the developer B, as an example. In other words, the functional units included in the code processing apparatus 100 according to the first embodiment (the secure input unit 110, the determining unit 120, the concealing unit 130, the linking instructing unit 140, the unconcealing unit 150, the secure output unit 160, and the unconcealing code acquiring unit 170) may be implemented by causing the computer 900 used by the developer B to execute the computer program.

In the same manner, the code processing apparatus 300 according to the second embodiment may be provided as a computer program executed by the computer 950 used by the developer B, as an example. In other words, the functional units included in the code processing apparatus 300 according to the second embodiment (the second secure input unit 112, the linking instructing unit 140, the unconcealing unit 150, and the second secure output unit 162) may be implemented by causing the computer 950 used by the developer B to execute the computer program.

In the same manner, the code processing apparatus 600 according to the third embodiment may be provided as a computer program executed by the computer 900 used by the developer B, as an example. In other words, the functional units included in the code processing apparatus 600 according to the third embodiment (the secure input unit 610, the separating unit 620, the determining unit 120, the concealing unit 130, the linking instructing unit 140, the unconcealing code acquiring unit 170, the unconcealing unit 150, the merging unit 630, and the secure output unit 640) may be implemented by causing the computer 900 used by the developer B to execute the computer program.

The computer program implementing the functional units of the code processing apparatus 100, 300, 600 is, for example, provided in a manner recorded in a computer-readable recording medium, which may be provided as a computer program product, such as a compact disc read-only memory (CD-ROM), a flexible disk (FD), a compact disc recordable (CD-R), or a digital versatile disc (DVD), as a file in an installable or executable format.

The computer program implementing the functional units of the code processing apparatus 100, 300, 600 may be stored in a computer connected to a network such as the Internet, and may be made available for downloaded over the network. The computer program implementing the functional units of the code processing apparatus 100, 300, 600 may also be provided or distributed over a network such as the Internet. Furthermore, the computer program implementing the functional units of the code processing apparatus 100, 300, 600 may be provided incorporated in, for example, a read-only memory (ROM) in advance.

The computer program implementing the functional units of the code processing apparatus 100, 300, 600 has a modular structure including the modules corresponding to the respective functional units. As actual hardware, by causing a central processing unit (CPU) (processor) in the computer 900, 950 to read the computer program from the storage medium and to execute the computer program, the modules are loaded onto the main memory, and the functional units of the code processing apparatus 100, 300, 600 are generated on the main memory.

The functional units of code processing apparatus 100, 300, 600 may also be entirely or partly implemented using specialized hardware such as an application specific integrated circuit (ASIC) or a field-programmable gate array (FPGA).

As explained above using specific examples, the code processing apparatus according to the embodiment enables a general-purpose linker to perform the linking process, while keeping the program code concealed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A code processing apparatus comprising:
   processing circuitry configured to:
   determine, based on relocation information included in first code data that includes a pre-linked code body and relocation information representing a portion of the code body to be relocated by a linker, a first portion including at least a part of the code body excluding the portion which the linker rewrites along with relocation;
   conceal the first portion of a pre-linked code body included in the first code data before the linker performs relocation;
   instruct the linker to process the first code data having the first portion concealed;
   unconceal the concealed portion of second code data that is generated from the first code data by the linker; and
   identify a position of the concealed portion of the second code data based on symbol information output from the linker and a symbol indicating a position in the code body, and unconceals the identified concealed portion.

2. The code processing apparatus according to claim 1, wherein the processing circuitry is further configured to:
   acquire an unconcealing code for unconcealing the concealed portion, and
   unconceal the concealed portion of the second code data using the acquired unconcealing code.

3. The code processing apparatus according to claim 2, wherein the processing circuitry is further configured to:
   conceal the first portion by replacing an original code of the first portion with a dummy code, and
   acquire the original code from the first code data as the unconcealing code.

4. The code processing apparatus according to claim 2, wherein the processing circuitry is further configured to:
   conceal the first portion by encrypting an original code of the first portion, and
   acquire the unconcealing code by decrypting the concealed portion of the second code data.

5. The code processing apparatus according to claim 1, wherein the processing circuitry is further configured to:
   determine a concealing method based on the relocation information, and
   conceal the first portion using the concealing method determined by the determining.

6. The code processing apparatus according to claim 1, wherein processing circuitry is further configured to:
   record a unique tag for identification to a part of the first portion, and
   identify a position of the concealed portion of the second code data based on the tag, and unconceals the identified concealed portion.

7. The code processing apparatus according to claim 1, wherein the processing circuitry is further configured to:
   receive the first code data under protection from another apparatus and remove the protection, and
   determine the first portion based on the relocation information included in the first code data having the protection removed.

8. The code processing apparatus according to claim 7, wherein the processing circuitry is further configured to:
   receive one piece into which a plurality of pieces of first code data having been merged, and
   separate the one piece into the pieces of first code data.

9. The code processing apparatus according to claim 1, wherein the processing circuitry is further configured to:
   output the second code data with the concealed portion unconcealed under protection.

10. The code processing apparatus according to claim 9, wherein the processing circuitry is further configured to:
    merge a plurality of pieces of second code data having the concealed portion unconcealed into one piece, and
    output the one piece into which the pieces of second code data are merged under protection.

11. A code processing apparatus comprising:
    processing circuitry configured to:
    acquire a pre-linked concealed code that conceals a first portion of a pre-linked code body and a protected unconcealing code for unconcealing the first portion, the pre-linked concealed code and the protected unconcealing code being output from another apparatus;
    instruct a linker to perform processing with respect to the acquired pre-linked concealed code;
    unconceal the concealed portion of second code data generated from the first code data by the linker using the acquired protected unconcealing code; and
    identify a position of the concealed portion of the second code data based on symbol information output from the linker and a symbol indicating a position in the code body, and unconceals the identified concealed portion.

12. A computer program product comprising a non-transitory computer-readable medium containing a program executed by a computer, the program causing the computer to execute:
    determining, based on relocation information included in first code data that includes a pre-linked code body and relocation information representing a portion of the code body to be relocated by a linker, a first portion including at least a part of the code body excluding the portion which the linker rewrites along with relocation;

concealing the first portion of the pre-linked code body included in the first code data before the linker performs relocation;

instructing the linker to process the first code data having the first portion concealed;

unconcealing the concealed portion of second code data that is generated the first code data by the linker; and identify a position of the concealed portion of the second code data based on symbol information output from the linker and a symbol indicating a position in the code body, and unconceals the identified concealed portion.

13. A computer program product comprising a non-transitory computer-readable medium containing a program executed by a computer, the program causing the computer to execute:

acquiring a pre-linked concealed code that conceals a first portion of a pre-linked code body and a protected unconcealing code for unconcealing the first portion, the pre-linked concealed code and the protected unconcealing code being output from another apparatus;

instructing a linker to perform processing with respect to the acquired pre-linked concealed code;

unconcealing the concealed portion of second code data generated from the first code data by the linker using the acquired protected unconcealing code; and identifying a position of the concealed portion of the second code data based on symbol information output from the linker and a symbol indicating a position in the code body, and unconcealing the identified concealed portion.

14. A code processing apparatus comprising:

processing circuitry configured to:

determine, based on relocation information included in first code data that includes a pre-linked code body and relocation information representing a portion of the code body to be relocated by a linker, a first portion including at least a part of the code body excluding the portion which the linker rewrites along with relocation;

conceal the first portion of a pre-linked code body included in the first code data before the linker performs relocation;

instruct the linker to process the first code data having the first portion concealed;

unconceal the concealed portion of second code data that is generated from the first code data by the linker;

record a unique tag for identification to a part of the first portion; and identify a position of the concealed portion of the second code data based on the tag, and unconceals the identified concealed portion.

\* \* \* \* \*